US012201954B2

United States Patent
Mortensen et al.

(10) Patent No.: US 12,201,954 B2
(45) Date of Patent: *Jan. 21, 2025

(54) ELECTRICALLY HEATED CARBON MONOOXIDE REACTOR

(71) Applicant: HALDOR TOPSØE A/S, Kgs. Lyngby (DK)

(72) Inventors: Peter Mølgaard Mortensen, Roskilde (DK); Kim Aasberg-Petersen, Allerød (DK); Michael Hultqvist, Bagsværd (DK); Robert Klein, Roskilde (DK); Kasper Emil Larsen, Humlebæk (DK)

(73) Assignee: HALDOR TOPSØE A/S, Kgs. Lyngby (DK)

( * ) Notice: Subject to any disclaimer, the term of this patent is extended or adjusted under 35 U.S.C. 154(b) by 219 days.

This patent is subject to a terminal disclaimer.

(21) Appl. No.: 17/778,039

(22) PCT Filed: Dec. 3, 2020

(86) PCT No.: PCT/EP2020/084408
§ 371 (c)(1),
(2) Date: May 19, 2022

(87) PCT Pub. No.: WO2021/110806
PCT Pub. Date: Jun. 10, 2021

(65) Prior Publication Data
US 2022/0410109 A1 Dec. 29, 2022

(30) Foreign Application Priority Data

Dec. 4, 2019 (EP) .................................... 19213432
Oct. 14, 2020 (EP) .................................... 20201817

(51) Int. Cl.
*B01J 12/00* (2006.01)
*B01J 19/00* (2006.01)
(Continued)

(52) U.S. Cl.
CPC .......... *B01J 12/007* (2013.01); *B01J 12/005* (2013.01); *B01J 19/0053* (2013.01);
(Continued)

(58) Field of Classification Search
None
See application file for complete search history.

(56) References Cited

U.S. PATENT DOCUMENTS 3,871,993 A 3/1975 Morrison
4,520,216 A 5/1985 Skov et al.
(Continued)

FOREIGN PATENT DOCUMENTS

AU 2019275850 A1 11/2020
CN 1031391 C 3/1996
(Continued)

OTHER PUBLICATIONS

European Search Report issued in corresponding Application No. EP 19 21 3432 dated May 8, 2020.
(Continued)

*Primary Examiner* — Colin W. Slifka
(74) *Attorney, Agent, or Firm* — Boone IP Law

(57) ABSTRACT

A reactor system and a process for carrying out reverse water gas shift reaction of a feedstock comprising $CO_2$ and $H_2$ to a first product gas comprising CO are provided, where a methanation reaction take place in parallel to the reverse water gas shift reaction, and where the heat for the endothermic reverse water gas shift reaction is provided by resistance heating.

20 Claims, 20 Drawing Sheets

(51) Int. Cl.
   *B01J 19/18* (2006.01)
   *C01B 32/40* (2017.01)
   *C10K 3/02* (2006.01)

(52) U.S. Cl.
   CPC .......... *B01J 19/1812* (2013.01); *C01B 32/40* (2017.08); *C10K 3/026* (2013.01); *B01J 2219/00135* (2013.01); *B01J 2219/00155* (2013.01); *B01J 2219/00159* (2013.01); *B01J 2219/00162* (2013.01); *B01J 2219/2434* (2013.01); *B01J 2219/2438* (2013.01)

(56) References Cited

U.S. PATENT DOCUMENTS

| | | |
|---|---|---|
| 6,207,042 B1 | 3/2001 | Holtermann |
| 9,752,080 B2 | 9/2017 | Christensen et al. |
| 2002/0094312 A1 | 7/2002 | Hanus et al. |
| 2003/0143135 A1 | 7/2003 | O'Rear et al. |
| 2003/0191199 A1 | 10/2003 | O'Rear |
| 2009/0252919 A1 | 10/2009 | Ogura |
| 2012/0201717 A1 | 8/2012 | Singh et al. |
| 2013/0065974 A1 | 3/2013 | Kresnyak |
| 2013/0082211 A1 | 4/2013 | Aasberg-Petersen et al. |
| 2014/0326640 A1 | 11/2014 | De Klerk |
| 2015/0129805 A1 | 5/2015 | Karpenko et al. |
| 2015/0259202 A1 | 9/2015 | Dybkjr et al. |
| 2019/0211269 A1 | 7/2019 | Galloway |
| 2019/0225489 A1 | 7/2019 | Herskowitz et al. |
| 2019/0249094 A1 | 8/2019 | Snell et al. |
| 2019/0359894 A1 | 11/2019 | Heidel et al. |
| 2020/0063273 A1 | 2/2020 | Masel |
| 2020/0354216 A1 | 11/2020 | Mortensen |
| 2021/0171344 A1 | 6/2021 | Mortensen et al. |
| 2022/0081289 A1 | 3/2022 | De Sarkar et al. |
| 2022/0081292 A1 | 3/2022 | De Sarkar et al. |

FOREIGN PATENT DOCUMENTS

| | | |
|---|---|---|
| CN | 104169210 A | 11/2014 |
| CN | 111247091 A | 6/2020 |
| EP | 3574991 A1 | 12/2019 |
| EP | 3670443 A1 | 6/2020 |
| JP | 05-006120 U | 1/1993 |
| WO | 0076651 A1 | 12/2000 |
| WO | 2007/108014 A1 | 9/2007 |
| WO | 2014/056535 A1 | 4/2014 |
| WO | 2014/096226 A1 | 6/2014 |
| WO | 2015/015433 A1 | 2/2015 |
| WO | 2019110265 A1 | 6/2019 |
| WO | 2019110267 A1 | 6/2019 |
| WO | 2019110268 A1 | 6/2019 |
| WO | 2019110269 A1 | 6/2019 |
| WO | 2019228795 A1 | 12/2019 |
| WO | 2019228796 A1 | 12/2019 |
| WO | 2019228798 A1 | 12/2019 |
| WO | 2020/207926 A1 | 10/2020 |
| WO | 2020/208008 A1 | 10/2020 |
| WO | 2021/110754 A1 | 6/2021 |
| WO | 2022/079098 A1 | 4/2022 |

OTHER PUBLICATIONS

European Search Report issued in corresponding Application No. EP 20 20 1817 dated Mar. 17, 2021.
International Search Report (PCT/ISA/210) and Written Opinion (PCT/ISA/237) mailed on Feb. 12, 2021, by the European Patent Office as the International Searching Authority for International Application No. PCT/EP2020/084408.
Wu et al., "Methanation of CO 2 and reverse water gas shift reaction on Ni/SiO 2 catalysts: the influence of particle size on selectivity and reaction pathway", Catalysis Science & Technology. Vol. 5, No. 8, Jan. 1, 2015, pp. 4154-4163.
Communication dated Mar. 25, 2021 and Search Report dated Mar. 17, 2021 issued in corresponding European Patent Application No. 20201822.2. (7 pages).
Extended European Search Report dated Mar. 25, 2021, issued by the European Patent Office in corresponding European Application No. 20201816.4. (8 pages).
Extended European Search Report mailed on Jul. 8, 2021, by the European Patent Office for European Application No. (2115595534).
International Preliminary Report on Patentability received for PCT Patent Application No. PCT/EP2020/084408, mailed on Jun. 16, 2022, 8 pages.
International Preliminary Report on Patentability received for PCT Patent Application No. PCT/EP2021/078142, mailed on Apr. 27, 2023, 8 pages.
International Preliminary Report on Patentability received for PCT Patent Application No. PCT/EP2021/078304, mailed on Apr. 27, 2023, 8 pages.
International Preliminary Report on Patentability received for PCT Patent Application No. PCT/EP2022/051090, mailed on Aug. 10, 2023, 11 pages.
International Preliminary Report on Patentability received for PCT Patent Application No. PCT/EP2022/053062, mailed on Aug. 24, 2023, 11 pages.
International Search Report and Written Opinion received for PCT Patent Application No. PCT/EP2021/078142, mailed on Jan. 4, 2022, 11 pages.
International Search Report and Written Opinion received for PCT Patent Application No. PCT/EP2022/051090, mailed on May 10, 2022, 14 pages.
International Search Report and Written Opinion received for PCT Patent Application No. PCT/EP2022/053062, mailed on May 12, 2022, 13 pages.
International Search Report and Written Opinion received for PCT Patent Application No. PCT/EP21/078304, mailed on Dec. 23, 2021, 11 pages.
Office Action received for European Application No. 20816477, mailed on Aug. 16, 2023, 6 pages.
Yabe, Tomohiro et al., "Low-temperature dry reforming of methane to produce syngas in an electric field over La-doped Ni/ZrO2 catalysts", Fuel Processing Technology, Dec. 23, 2016, vol. 158, pp. 96-103, Elsevier B.V., NL. (8 pages).
Office Action received for Chinese Patent Application No. 202080084115.7, mailed on Apr. 6, 2023, 17 pages (7 pages of English Translation and 10 pages of Original Document).
U.S. Appl. No. 18/245,730, Sudip De Sarkar, filed Mar. 17, 2023.
U.S. Appl. No. 18/026,977, Kim Aasberg-Petersen, filed Mar. 17, 2023.
U.S. Appl. No. 18/257,339, Kim Aasberg-Petersen, filed Jun. 14, 2023.
U.S. Appl. No. 18/276,341, Ole Frej Alkilde, filed Aug. 8, 2023.

ELECTRICALLY HEATED CARBON MONOOXIDE REACTOR

TECHNICAL FIELD

The present invention relates to a reactor system and a process for production of gas from a feedstock comprising $CO_2$ and $H_2$ in the presence of a catalyst under reverse water gas shift reaction conditions.

BACKGROUND

Synthesis gas production typically takes place in large chemical plants, due to the energy intensive reactions needed to facilitate the production. This makes small scale production difficult. The toxicity of the synthesis gas (especially due to the content of carbon monoxide), additionally, makes storage of the synthesis gas difficult and imposes a significant risk.

There is the need for on-demand synthesis gas production in smaller plants using a relative simple production setup with minimal operator input needed using an easily storable reactant for the synthesis gas production.

Systems and methods for carrying out endothermic catalytic reactions are set out in co-pending patent application PCT/EP2019/062424.

Furthermore, there is presently a high interest in processes, which are capable of capturing and utilizing carbon dioxide, such as the reverse water gas shift reaction, with the object of reducing carbon dioxide emissions to the atmosphere. Accordingly, there is presently a strong need for improved reactors and processes for carrying out a reverse water gas shift reaction. The produced synthesis gas can be utilized for a variety of applications including methanol and synthetic fuels for example via the Ficsher-Tropsch synthesis.

SUMMARY

So, in a first aspect, the invention provides a reactor system for carrying out a reverse water gas shift reaction for production of a first product gas comprising CO from a feedstock comprising $CO_2$ and $H_2$, said reactor system comprising:
  a supply of feedstock comprising $CO_2$ and $H_2$;
  a structured catalyst comprising a macroscopic structure of an electrically conductive material and a catalytically active material capable of catalysing both the reverse water gas shift reaction and a methanation reaction;
  the structured catalyst arranged for being operated under such temperature and pressure that both the reverse water gas reaction and the methanation reaction take place;
  a pressure shell housing said structured catalyst, said pressure shell comprising an inlet for letting in said feedstock and an outlet for letting out product gas, wherein said inlet is positioned so that said feedstock enters said structured catalyst in a first end of said structured catalyst and said product gas exits said structured catalyst from a second end of said structured catalyst;
  a heat insulation layer between said structured catalyst and said pressure shell;
  at least two conductors electrically connected to said structured catalyst and to an electrical power supply placed outside said pressure shell, wherein said electrical power supply is dimensioned to heat at least part of said structured catalyst to a temperature of at least 500° C. by passing an electrical current through said macroscopic structure, wherein said at least two conductors are connected to the structured catalyst at a position on the structured catalyst closer to said first end of said structured catalyst than to said second end of said structured catalyst, and wherein the structured catalyst is constructed to direct an electrical current to run from one conductor substantially to the second end of the structured catalyst and return to a second end of said at least two conductors;
  an outlet for a first product gas comprising CO.

In a further aspect, a process is provided for converting a feedstock comprising $CO_2$ and $H_2$ to a first product gas comprising CO in a reactor system comprising a pressure shell housing a structured catalyst comprising a macroscopic structure of electrically conductive material and a catalytically active material; wherein said reactor system is provided with heat insulation between said structured catalyst and said pressure shell; said process comprising the steps of:
  providing a pressurized feedstock;
  supplying said pressurized feedstock to said pressure shell through an inlet positioned so that said feedstock enters said structured catalyst in a first end of said structured catalyst;
  using a catalytically active material capable of catalysing both the reverse water gas shift reaction and a methanation reaction;
  allowing the feedstock to undergo a reverse water gas shift reaction over the structured catalyst under such temperature and pressure that both the reverse gas shift reaction and the methanation reaction take place;
  outletting a product gas from said pressure shell, wherein said product gas exits said structured catalyst from a second end of said structured catalyst;
  supplying electrical power via electrical conductors connecting an electrical power supply placed outside said pressure shell to said structured catalyst, allowing an electrical current to run through said macroscopic structure, thereby heating at least part of the structured catalyst to a temperature of at least 500° C., wherein said at least two conductors are connected to the structured catalyst at a position on the structured catalyst closer to said first end of said structured catalyst than to said second end of said structured catalyst, and wherein the structured catalyst is constructed to direct an electrical current to run from one conductor substantially to the second end of the structured catalyst and return to a second of said at least two conductors, thereby heating at least part of the structured catalyst to a temperature sufficient for said feedstock to undergo the reverse water gas shift reaction over the structured catalyst,
  outletting a first product gas comprising CO from the reactor system.

In a further aspect, a method is provided for rapidly switching a reverse water gas shift reaction of a feedstock comprising $CO_2$ and $H_2$ in a reactor system as set out herein, from a first steady-state reaction condition (A) to a second steady-state reaction condition (B) or vice-versa; said method comprising the steps of:
  in said first steady-state reaction condition (A):
    supplying said feedstock to the reactor system in a first total flow, and
    supplying a first electrical power via electrical conductors connecting an electrical power supply placed outside said pressure shell to said structured catalyst, thereby allowing a first electrical current to run through said electrically conductive material, thereby heating at least part of the structured catalyst to a first temperature at which said feedstock is converted to a first product gas over said structured catalyst under said first steady-state reaction conditions (A); and said first product gas is outlet from the reactor system;

and, in said second steady-state reaction condition (B):
supplying said feedstock to the reactor system in a second total flow, supplying a second electrical power via electrical conductors connecting an electrical power supply placed outside said pressure shell to said structured catalyst, thereby allowing a second electrical current to run through said electrically conductive material, thereby heating at least part of the structured catalyst to a second temperature; at which said feedstock is converted to a second product gas over said structured catalyst under said second steady-state reaction conditions (B); and said second product gas is outlet from the reactor system;

wherein said second electrical power is higher than said first electrical power; and/or said second total flow is higher than said first total flow.

Additional aspects of the invention are set out in the following detailed description, the examples and the appended claims.

LEGENDS TO THE FIGURES

DETAILED DISCLOSURE

Figure 1A:
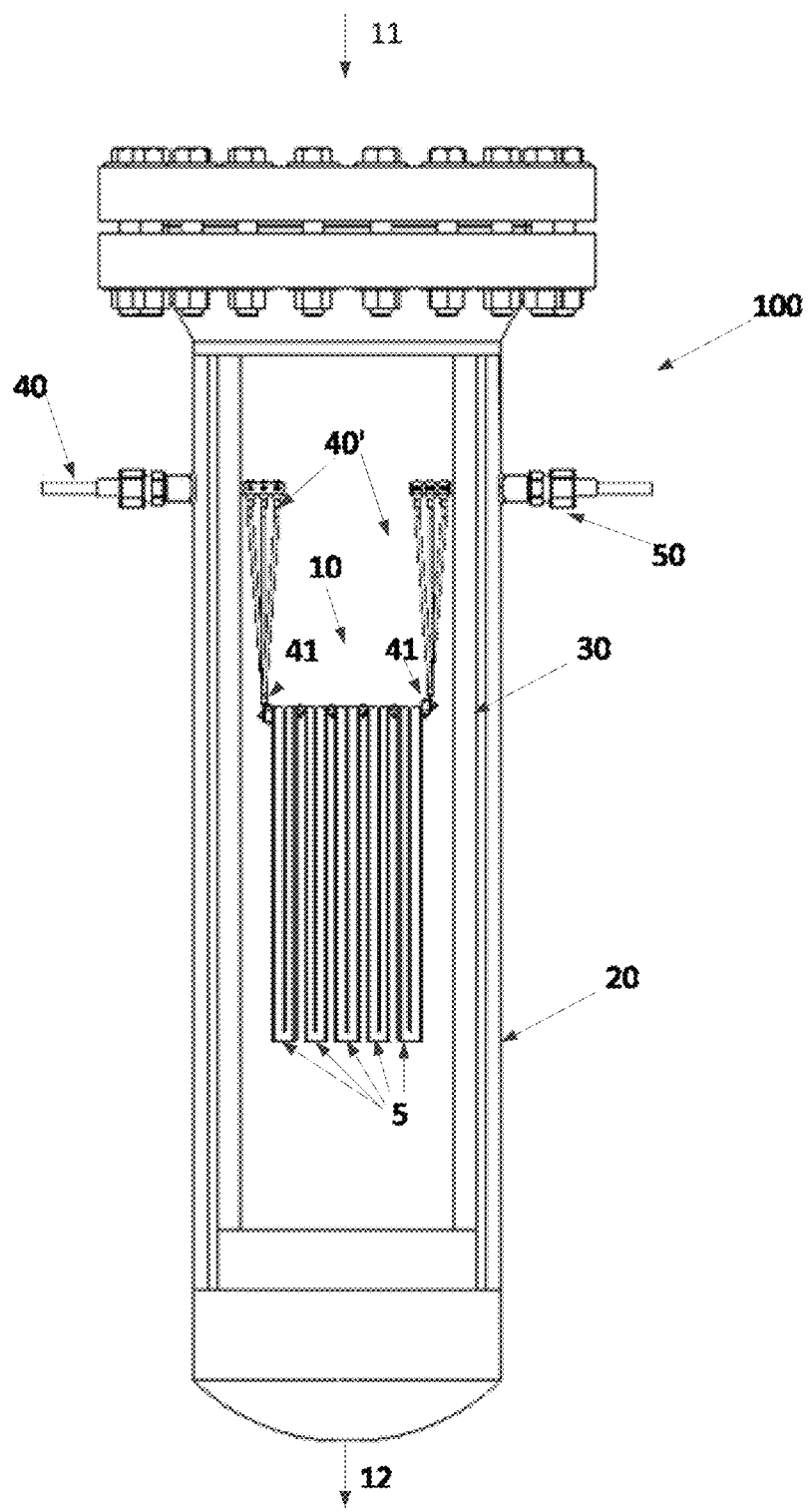
FIG. 1a shows a cross section through an embodiment of the inventive reactor system with a structured catalyst comprising an array of macroscopic structures, in a cross section.

Electrically heating offers a solution for rapidly heating up a reverse water gas shift catalyst, to make an on demand synthesis gas production. This allows for rapid production of synthesis gas in e.g. chemical plants to facilitate other chemical reactions from these molecules. Examples of such reactions include methanol, phosgene, acetic acid, and oxo-alcohols. Also, the solutions allows for on-demand synthesis gas production in smaller plants using a relative simple production setup with minimal operator input needed using an easily storable reactant for the synthesis gas production. Also the method offers a solution for on-demand synthesis gas production according to fluctuating electric energy availability from renewable electricity sources such as wind or solar.

The present technology describes how an electrically heated reactor can facilitate the task of producing synthesis gas from $CO_2$ and $H_2$ in a compact design in an on-demand approach under methanation and reverse water gas shift reaction conditions.

The reverse water gas shift reaction is utilized:

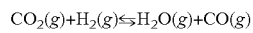

$CO_2(g)+H_2(g) \leftrightharpoons H_2O(g)+CO(g)$

In combination with the methanation reaction:

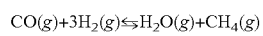

$CO(g)+3H_2(g) \leftrightharpoons H_2O(g)+CH_4(g)$

Typically, a catalyst with a catalytically active material comprising Nickel (Ni) or noble metals can be used.

A compact electric reactor using monolithic catalyst can easily be operated and use easy start-up principles to produce gas when needed. This gives a relative inexpensive plant where gas can be produced in only the required amounts and little to no gas storage is needed, while transport of gas also is reduced or completely eliminated. Simple reactor equipment and simple operation of the methanation and reverse water gas shift reactions process makes gas production attractive in delocalized plants which reduce risks of gas handling.

Additionally, the use of electricity as a heat source allows rapid start-up and shut-down (within a matter of minutes or hours). This almost instantaneous switch from stand-by to gas production and vice-versa also reduces the requirement for storage of gas.

The present invention relates to a reactor system for carrying out a reverse water gas shift reaction for production of a first product gas comprising CO from a feedstock comprising $CO_2$ and $H_2$, said reactor system comprising:
a supply of feedstock comprising $CO_2$ and $H_2$;
a structured catalyst comprising a macroscopic structure of an electrically conductive material and a catalytically active material capable of catalysing both the reverse water gas shift reaction and a methanation reaction;

the structured catalyst arranged for being operated under such temperature and pressure that both the reverse water gas reaction and the methanation reaction take place;

a pressure shell housing said structured catalyst, said pressure shell comprising an inlet for letting in said feedstock and an outlet for letting out product gas, wherein said inlet is positioned so that said feedstock enters said structured catalyst in a first end of said structured catalyst and said product gas exits said structured catalyst from a second end of said structured catalyst;

a heat insulation layer between said structured catalyst and said pressure shell;

at least two conductors electrically connected to said structured catalyst and to an electrical power supply placed outside said pressure shell, wherein said electrical power supply is dimensioned to heat at least part of said structured catalyst to a temperature of at least 500° C. by passing an electrical current through said macroscopic structure, wherein said at least two conductors are connected to the structured catalyst at a position on the structured catalyst closer to said first end of said structured catalyst than to said second end of said structured catalyst, and wherein the structured catalyst is constructed to direct an electrical current to run from one conductor substantially to the second end of the structured catalyst and return to a second end of said at least two conductors;

an outlet for a first product gas comprising CO.

In reverse water gas shift reactions, it has previously been the goal to limit methanation to take place in parallel to the reverse water gas shift reaction, which typically is challenged when going to temperatures exceeding 500° C. where the reaction kinetics for methanation increases on catalysts traditionally unreactive for this reaction. Such methanation is an undesired side-reaction, which reduces the yield of the process gas and usually it is attempted to avoid or reduce methanation as much as possible. The present invention is based on the recognition that in a reactor type as used in present invention, it is possible to operate the reverse water gas shift reaction at such high temperature that it is no longer necessary to avoid the methanation reaction, because any methane formed will subsequently be converted into hydrogen, $CO_2$ and CO in the reverse methanation reaction. The present invention is further based on the recognition that a prerequisite for this to be possible is that a catalyst capable of catalyzing both reverse water gas shift and methanation is used.

A central aspect of the reverse water gas shift reactor is to facilitate the conversion of $CO_2$ into CO, but avoiding further reaction of the CO into carbon. This carbon can be in the form of both carbon formed on the catalyst or carbon formed in metal parts, so called metal dusting. The central carbon forming reactions to consider when converting $CO_2$ into CO are the Boudouard reaction and CO reduction reactions, respectively given as:

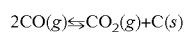

$2CO(g) \leftrightarrows CO_2(g) + C(s)$

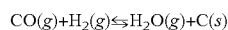

$CO(g) + H_2(g) \leftrightarrows H_2O(g) + C(s)$

Both reactions are exothermic and are consequently favored at lower temperatures. Especially the CO reduction reaction can be a significant challenge when facilitating the reverse water gas shift reaction regime, as it is the intention of a reverse water gas shift reactor to have little to no $H_2O$ in the feed as this gives a reduced potential for conversion according to the reverse water gas shift reaction. This however also means that the potential for carbon formation in the first part of a reverse water gas shift reactor through the CO reduction reaction is high, because the combination of high $H_2$ partial pressure and low $H_2O$ partial pressure gives a high driving force for this reaction. In this regard it is an advantage to allow the methanation reaction to take place in parallel according to the following reaction scheme:

$CO (g) + 3H_2 \leftrightarrows CH_4 (g) + H_2O (g)$

As it can be seen this reaction both reduces the partial pressure of the formed CO and increases the partial pressure of $H_2O$, both aspects effectively reducing the potential for the CO reduction reaction to take place. Additionally, the risk of carbon formation on the catalyst from the CO reduction reaction is reduced in the case where the methanation reaction also takes place, because catalyst reaction mechanism perspective adsorbed carbon atoms is an intermediate in the methanation reaction scheme (as described by H. S. Bengaard, J. K. Nørskov, J. Sehested, B. S. Clausen, L. P. Nielsen, A. M. Molenbroek, J. R. Rostrup-Nielsen, "Steam Reforming and Graphite Formation on Ni Catalysts", Journal of Catalysis, Volume 209, Issue 2, 2002, Pages 365-384). This means that any formed C atoms on the catalyst surface can be hydrogenated to methane instead of polymerizing to a carbon layer. This gives an advantage in the design of a functional catalyst. Lastly, the cocurrent occurence of methanation in the reverse water gas shift reactor results in release of chemical energy to heat the system and a resulting temperature increase as the methanation is exothermic. As the CO reduction reaction also is exothermic, the increase in temperature created by the methanation reaction results in a reduction of the potential for the CO reduction reaction and when the temperature has risen to a certain level no potential for the CO reduction reaction will be present at all. This exact level will be dependent on the specific reactant concentration, inlet temperature, and pressure, but will typically be in the range from 600-800° C. above which the CO reduction reaction will not have a potential to take place. Notice, that the exotherm generated by the methanation reaction will give the highest temperature rise at the active site of the catalysts on the surface of the structured catalyst which is also the place where carbon formation can take place. Consequently, this exotherm has a pronounced positive effect for reducing the carbon formation potential.

Overall, the configuration of the invention allows for facilitating the reverse water gas shift reaction and the methanation reaction within a reactor system without having a side reaction of carbon formation on neither the catalyst nor metallic surfaces, as the methanation reaction counterintuitatively mitigates this. The specific configuration of the reactor system which allows for increasing the temperature from a relative low inlet temperature to a very high product gas temperature of more than 500° C., preferably more than 800° C., and even more preferably more than 900° C. or 1000° C. means that the resulting methane formed from the methanation reaction will occur in the first part of the reactor, but when exceeding ca. 600-800° C. this methane will start to be converted by the reverse methanation reaction back to a product of $CO_2$ and $H_2$. This configuration elegantly allows for removing some of the CO and generation of some $H_2O$ inside the catalyst bed in the temperature region where CO reduction is a problem, but then allows for reproducing the CO in the high temperature zone with low or no carbon potential. Effectively, utilizing the high product gas temperature then means that the final product can be delivered with a very low methane concentration, despite the methane has a peak concentration somewhere along the reaction zone. In an embodiment, the reactor system is operated with none, or very little, methane in the feed and only very little methane in the product gas, but with a peak in methane concentration inside the reaction zone higher than in the feed and/or product gas. In some cases this peak methane concentration inside the reaction zone may be an order of magnitude higher than the inlet and outlet methane concentrations.

In an embodiment of the reactor system of the invention, the structured catalyst has a first reaction zone disposed closest to the first end of said structured catalyst, wherein the first reaction zone has an overall exothermic reaction, and a second reaction zone disposed closest to the second end of said structured catalyst, wherein the second reaction zone has an overall endothermic reaction. Preferably, said first reaction zone has an extension of from 5% to 60% of the length of the structured catalyst from its first to its second end. Here, the reaction zone means the volume of the reactor system catalyzing the methanation and reverse water gas shift reactions as evaluated along the flowpath through the catalytic area.

The combined activity for both reverse water gas shift and methanation in a reactor system of the invention entails that the reaction scheme inside the reactor will start out as exothermic in the first part of the reactor system but end as endothermic towards the exit of the reactor system. This relates to the heat of reaction ($Q_r$) added or removed during the reaction, according to the general heat balance of the plug flow reactor system:

$$F \cdot C_{pm} \cdot dT/dV = Q_{add} + Q_r = Q_{add} + \Sigma(-\Delta_r H_i) \cdot (-r_i)$$

where F is the flow rate of process gas, $C_{pm}$ is the heat capacity, V the volume of the reaction zone, T the temperature, $Q_{add}$ the energy supply/removal from the surrounding, and $Q_r$ the energy supply/removal associated with chemical reactions which are given as the sum of all chemical reactions facilitated within the volume and calculated as the product between the reaction enthalpy and the rate of reaction of a given reaction. In an embodiment of the reactor system of the invention, the temperature of the feedstock at the inlet of the pressure shell is between 200° C. and 500° C., preferably between 200° C. and 400° C.

In an embodiment of the reactor system of the invention, the concentration of methane is higher in the partly catalyzed feedstock inside at least a part of the structured catalyst than in the feedstock and in the first product gas.

In an embodiment of the reactor system of the invention, the temperature of the structured catalyst is continuously increasing from the first end to the second end of the structured catalyst.

The layout of the reactor system allows for feeding a pressurized feedstock to the reactor system at an inlet and directing this gas into the pressure shell of the reactor system. In one embodiment, the pressurized feedstock is provided by pressurizing the feedstock(s) in one or more compressor. In another embodiment the pressurized feedstock is provided as an imported gas stream from a different process. Inside the pressure shell, a configuration of heat insulation layers and inert material is arranged to direct the feedstock through the structured catalyst where it will be in contact with the catalyst material, where the catalytically active material will facilitate the methanation and reverse water gas shift reactions. Additionally, the heating of the structured catalyst will supply the required heat for the endothermic reaction. The product gas from the heated structured catalyst is led to the reactor system outlet.

The close proximity between the catalytically active material and the electrically conductive materials enables efficient heating of the catalytically active material by close proximity heat conduction from the resistance heated electrically conductive material. An important feature of the resistance heating process is thus that the energy is supplied inside the object itself, instead of being supplied from an external heat source via heat conduction, convection and radiation. Moreover, the hottest part of the reactor system will be within the pressure shell of the reactor system. Preferably, the electrical power supply and the structured catalyst are dimensioned so that at least part of the structured catalyst reaches a temperature of at least 500° C., preferably at least 900° C. The surface area of the electrically conductive material may be tailored to the specific reaction at the given operating conditions.

The electrically conductive material is suitably a macroscopic structure. As used herein, the term "macroscopic structure" is meant to denote a structure that is large enough to be visible with the naked eye, without magnifying devices. The dimensions of the macroscopic structure are typically in the range of centimeters or even meters. Dimensions of the macroscopic structure are advantageously made to correspond at least partly to the inner dimensions of the pressure shell housing the structured catalyst, saving room for the heat insulation layer and conductors. Two or more macroscopic structures may be connected in order to provide an array of macroscopic structures having at least one of the outer dimensions in the range of meters, such as 2 m or 5 m. Such two or more macroscopic structures may be denoted "an array of macroscopic structures". In this case the dimensions of an array of macroscopic structures are advantageously made to correspond at least partly to the inner dimension of the pressure shell housing the structured catalyst (saving room for the heat insulation layer). A conceivable array of macroscopic structures could take up a volume of 0.1 to 10 m³ or even larger. The structured catalyst may comprise a single macroscopic structure or an array of macroscopic structures, where the macroscopic structure(s) support(s) a ceramic coating supporting catalytically active material. In an array of macroscopic structures, the macroscopic structures may be electrically connected to each other; however, alternatively, the macroscopic structures are not electrically connected to each other. Thus, the structured catalyst may comprise two or more macroscopic structures positioned adjacent to each other. The macroscopic structure(s) may be extruded and sintered structures or 3D printed structures. A 3D printed macroscopic structure can be provided with or without subsequent sintering.

The physical dimensions of the macroscopic structure may be any appropriate dimensions; thus, the height may be smaller than the width of the macroscopic structure or vice versa.

The macroscopic structure may support a ceramic coating, where the ceramic coating may supports a catalytically active material. The term "macroscopic structure supporting a ceramic coating" is meant to denote that the macroscopic structure is coated by the ceramic coating at, at least, a part of the surface of the macroscopic structure. Thus, the term does not imply that all the surface of the macroscopic structure is coated by the ceramic coating; in particular, at least the parts of the macroscopic structure which are electrically connected to the conductors do not have a coating thereon. The coating may be a ceramic material with pores in the structure, which allows for supporting catalytically active material on and inside the coating. Advantageously, the catalytically active material comprises catalytically active particles having a size in the range from about 2 nm to about 250 nm. The fraction of the electrically conductive material coated with a ceramic coating, the type and structure of the ceramic coating, and the amount and composition of the catalytically active catalyst material may be tailored to the specific reaction at the given operating conditions.

Preferably, the macroscopic structure has been manufactured by extrusion of a mixture of powdered metallic particles and a binder to an extruded structure and subsequent sintering of the extruded structure, thereby providing a material with a high geometric surface area per volume. Preferably, the extruded structure is sintered in a reducing atmosphere to provide the macroscopic structure. Alternatively, the macroscopic structure is 3D printed a metal additive manufacturing melting process, viz. a 3D printing processes, which do not require subsequent sintering, such as powder bed fusion or direct energy deposition processes. Examples of such powder bed fusion or direct energy deposition processes are laser beam, electron beam or plasma 3D printing processes. As another alternative, the macroscopic structure may have been manufactured as a 3D metal structure by means of a binder-based metal additive manufacturing process, and subsequent sintered in a non-oxidizing atmosphere at a first temperature $T_1$, where $T_1 > 1000°$ C., in order to provide the macroscopic structure.

A ceramic coating, which may contain the catalytically active material, may be provided onto the macroscopic structure before a second sintering in an oxidizing atmosphere, in order to form chemical bonds between the ceramic coating and the macroscopic structure. Alternatively, the catalytically active material may be impregnated onto the ceramic coating after the second sintering. When chemical bonds are formed between the ceramic coating and the macroscopic structure, an especially high heat conductivity between the electrically heated macroscopic structure and the catalytically active material supported by the ceramic coating is possible, offering close and nearly direct contact between the heat source and the catalytically active material of the structured catalyst. Due to close proximity between the heat source and the catalytically active material the heat transfer is effective, so that the structured catalyst can be very efficiently heated. A compact reactor system in terms of gas processing per reactor system volume is thus possible, and therefore the reactor system housing the structured catalyst may be compact.

As used herein, the terms "3D print" and "3D printing" is meant to denote a metal additive manufacturing process. Such metal additive manufacturing processes cover 3D printing processes in which material is joined to a structure under computer control to create a three-dimensional object, where the structure is to be solidified, e.g. by sintering, to provide the macroscopic structure. Moreover, such metal additive manufacturing processes cover 3D printing processes, which do not require subsequent sintering, such as powder bed fusion or direct energy deposition processes. Examples of such powder bed fusion or direct energy deposition processes are laser beam, electron beam or plasma 3D printing processes.

The reactor system does not need a furnace and this reduces the overall reactor size considerably.

In an embodiment, the electrically conductive material is one or more elements selected from the group consisting of Fe, Ni, Cu, Co, Cr, Al, Si and an alloy thereof. Such an alloy may comprise further elements, such as Mn, Y, Zr, C, Co, Mo or combinations thereof. Preferably, the electrically conductive material comprises Fe, Cr, Al or an alloy thereof. Such an alloy may comprise further elements, such as Si, Mn, Y, Zr, C, Co, Mo or combinations thereof. Preferably, the catalytically active material is particles having a size from 2 nm to 250 nm. Preferably, the conductors and the electrically conductive material are made of different materials than the electrically conductive material. The conductors may for example be of iron, nickel, aluminum, copper, silver or an alloy thereof. The ceramic coating is an electrically insulating material and will typically have a thickness in the range of around 100 μm, say 10-500 μm.

The electrically conductive material is advantageously a coherent or consistently intra-connected material in order to achieve electrical conductivity throughout the electrically conductive material, and thereby achieve thermal conductivity throughout the structured catalyst and in particular providing heating of the catalyst material. By the coherent or consistently intra-connected material it is possible to ensure uniform distribution of current within the electrically conductive material and thus uniform distribution of heat within the structured catalyst. Throughout this text, the term "coherent" is meant to be synonymous to cohesive and thus refer to a material that is consistently intra-connected or consistently coupled. The effect of the structured catalyst being a coherent or consistently intra-connected material is that a control over the connectivity within the material of the structured catalyst and thus the conductivity of the electrically conductive material is obtained. It is to be noted that even if further modifications of the electrically conductive material are carried out, such as provision of slits within parts of the electrically conductive material or the implementation of insulating material within the electrically conductive material, the electrically conductive material is still denoted a coherent or consistently intra-connected material.

The gas flow over the structured catalyst may be axial or co-axial with the current path through the structured catalyst, perpendicular to the current path or have any other appropriate direction in relation to the current path.

The overall reaction scheme of converting $CO_2$ to CO is endothermic. High temperatures typically in excess of 700-1000° C. are needed to reach good selectivity towards CO.

The feedstock to the reverse water gas shift reaction is in an embodiment a substantially pure stream of $H_2$ and $CO_2$ in a ratio of $H_2$ to $CO_2$ of from 2 to 4. In another embodiment, the feedstock is a mixture of $CO_2$ and $H_2$ and steam in a $CO_2$, $H_2$ to steam ratio of 1:1:1. In another embodiment the $H_2:CO_2$-ratio is between 2.5-4 and a small amount of steam is present in the feedstock such that $H_2O/CO_2=0.05-0.2$.

The term "electrically conductive" is meant to denote materials with an electrical resistivity in the range from: $10^{-5}$ to $10^{-8}$ Ω·m at 20° C. Thus, materials that are electrically conductive are e.g. metals like copper, silver, aluminum, chromium, iron, nickel, or alloys of metals. Moreover, the term "electrically insulating" is meant to denote materials with an electrical resistivity above 10 Ω·m at 20° C., e.g. in the range from $10^9$ to $10^{25}$ Ω·m at 20° C.

When the reactor system comprises a heat insulation layer between the structured catalyst and the pressure shell, appropriate heat and electrical insulation between the structured catalyst and the pressure shell is obtained. The presence of heat insulating layer between the pressure shell and the structured catalyst assists in avoiding excessive heating of the pressure shell, and assists in reducing thermal losses to the surroundings. The temperatures of the structured catalyst may reach up to about 1300° C., at least at some parts thereof, but by using the heat insulation layer between the structured catalyst and the pressure shell the temperature of the pressure shell can be kept at significantly lower temperatures of say 500° C. or even 100° C., which is advantageous as typical construction steel materials typically are unsuitable for pressure bearing application at temperatures above 1000° C. Moreover, a heat insulating layer between the pressure shell and the structured catalyst assists in control of the electrical current within the reactor system, since heat insulation layer is also electrically insulating. The heat insulation layer could be one or more layers of solid material, such as ceramics, inert material, fiber material, bricks or a gas barrier or a combination thereof. Thus, it is also conceivable that a purge gas or a confined gas constitutes or forms part of the heat insulation layer.

Moreover, it should be noted that the term "heat insulating material" is meant to denote materials having a thermal conductivity of about 10 $W \cdot m^{-1} \cdot K^{-1}$ or below. Examples of heat insulating materials are ceramics, bricks, alumina based materials, zirconia based materials and similar.

Advantageously, any relevant gaps between structured catalyst, the heat insulation layer, the pressure shell, and/or any other components inside the reactor system is filled with inert material, e.g. in the form of inert pellets. Such gaps are e.g. a gap between the lower side of the structured catalyst and the bottom of the pressure shell and a gap between the sides of the structured catalyst and the insulation layer covering the inner sides of the pressure shell. The inert material may e.g. be a ceramic material in the form of pellets or tiles. The inert material assists in controlling the gas distribution through the reactor system and in controlling the flow of the gas through the structured catalyst. Moreover, the inert material typically has a heat insulating effect.

In one embodiment of the reactor system of the invention, the pressure shell suitably has a design pressure of between 2 bar and 30 bar, preferably between 4 and 25 bar, more preferably between 6 and 20 bar, more preferably between 7 and 15 bar, and most preferably between 8 and 12 bar. At such levels of pressure it is possible to obtain a minimization of the level of methane in the exit product stream from the second reaction zone of the structured catalyst. As the hottest part of the reactor system is the electrically conductive material, which will be surrounded by heat insulation layer and within the pressure shell of the reactor system, the temperature of the pressure shell can be kept significantly lower than the maximum process temperature. This allows for having a relative low design temperature of the pressure shell of e.g. 500° C. or 300° C. or preferably 200° C. or 100° C. of the pressure shell whilst having maximum process temperatures of 400° C., or preferably 700, but even 1100° C., or even up to 1300° C. on the structured catalyst is possible. Material strength is higher at the lower of these temperatures (corresponding to the design temperature of the pressure shell as indicated above). This offers advantages when designing the chemical reactor.

In another embodiment of the reactor system of the invention, the pressure shell suitably has a design pressure of between 30 and 200 bar. As an alternative to the design pressure of between 2 and 30 bar, a design pressure of between 30 and 200 bar may be selected with an object of providing a product gas with a pressure adapted to the intended use of the product gas in a downstream process, e.g. as feed gas for methanol synthesis. For use in methanol synthesis, the pressure of the product gas preferably is between 70 and 100 bar, more preferably between 75 and 95 bar. For use in a Fischer-Tropsch process, the pressure of the product gas preferably is between 20 and 40 bar, more preferably between 25 and 35 bar.

The resistivity of the electrically conductive material suitably is between $10^{-5}$ $\Omega \cdot m$ and $10^{-7}$ $\Omega \cdot m$. A material with a resistivity within this range provides for an efficient heating of the structured catalyst when energized with a power source. Graphite has a resistivity of about $10^{-5}$ $\Omega \cdot m$ at 20° C., kanthal has a resistivity of about $10^{-6}$ $\Omega \cdot m$ at 20° C., whilst stainless steel has a resistivity of about $10^{-7}$ $\Omega \cdot m$ at 20° C. The electrically conductive material may for example be made of FeCrAlloy having a resistivity of ca. $1.5 \cdot 10^{-6}$ $\Omega \cdot m$ at 20° C.

Typically, the pressure shell comprises an inlet for letting in process gas and an outlet for letting out product gas, wherein the inlet is positioned close to a first end of the pressure shell and the outlet is positioned close to a second end of the pressure shell, and wherein the at least two conductors both are connected to the structured catalyst at a position on the structured catalyst closer to the inlet than to the outlet. Hereby, the at least two conductors can be placed in the substantially colder part of the reactor system as the inlet gas will have lower temperature than the product gas, the electrically conductive material will be colder in the most upstream part of the material due to the heat consumed by the progress of the chemical reaction, and the feedstock fed through the inlet may cool the at least two conductors before being heated by the heated structured catalyst further along the path of the gas over the heated structured catalyst. It is an advantage that the temperature of all electrically conducting elements except the electrically conductive material is kept down in order to protect the connections between the conductors and the structured catalyst. When the temperature of the conductors and other electrically conducting elements, except the electrically conductive material, is relatively low, less limitations on materials suitable for the conductors and other electrically conducting elements, except the electrically conductive material, exists. When the temperature of the electrically conducting elements increase, the resistivity thereof increases; therefore, it is desirable to avoid unnecessary heating of all other parts than the electrically conductive materials within the reactor system. The term "electrically conducting elements, except the electrically conductive material" is meant to cover the relevant electrically conducting elements arranged to connect the power supply to the structured catalyst, except the electrically conductive structured catalyst itself.

It should be noted, that the system of the invention may include any appropriate number of power supplies and any appropriate number of conductors connecting the power supply/supplies and the electrically conductive material(s) of the structured catalyst.

Suitably, the at least two conductors are led through a pressure shell in a fitting so that the at least two conductors are electrically insulated from the pressure shell. The fitting may be, partly, of a plastic and/or ceramic material. The term "fitting" is meant to denote a device that allows for mechanically connecting two pieces of hardware in a pressure bearing configuration. Thereby, the pressure within the pressure shell may be maintained even though the at least two conductors are lead through it. Non-limiting examples of the fittings may be an electrically insulating fitting, a dielectric fitting, a power compression seal, a compression fitting or a flange. The pressure shell typically comprises side walls, end walls, flanges and possibly further parts. The term "pressure shell" is meant to cover any of these components.

The pressure shell may further comprise one or more inlets close to or in combination with at least one of the fittings in order to allow a cooling gas to flow over, around, close to or inside at least one conductor within said pressure shell. Hereby, the conductors are cooled and thus the temperature that the fitting experiences is kept down. If the cooling gas is not used, the conductors may be heated by the feedstock to the reactor system, resistance heating of conductor due to the applied current, and/or heat conduction from the structured catalyst. The cooling gas could e.g. be hydrogen, argon, water, nitrogen, carbon dioxide, methanol or mixtures thereof. The temperature of the cooling gas at entry into the pressure shell may be e.g. about 50° C. or 200° C. or 250° C. In an embodiment, the conductor(s) is (are) hollow so that the cooling gas may flow through the conductor(s) and cool it (them) from within. By keeping the temperature of the fitting low, e.g. at around 100-200° C., it is easier to have a leak tight configuration. Typically, a part of the feedstock, such as one of the reactants, is fed to the pressure shell as the cooling gas. In another embodiment, part of the feedstock or a gas with the same composition as the feedstock is used as cooling gas.

The reactor system may further comprise an inner tube in heat exchange relationship with the structured catalyst, where the inner tube is adapted to withdraw a product gas from the structured catalyst so that the product gas flowing through the inner tube or tubes is in heat exchange relationship with the gas flowing over the structured catalyst, but electrically separated from the structured catalyst. This is a layout which here is denoted a bayonet reactor system. In this layout the product gas within the inner tube assists in heating the process gas flowing over the structured catalyst. The electrical insulation between the inner tube and the structured catalyst could be gas in the form of a gap or distance between the inner tube and the structured catalyst or inert material loaded around the inner tube and the structured catalyst. The gas may pass through the structured catalyst in an up-flow or a down-flow direction.

The connection between the structured catalyst and the at least two conductors may be a mechanical connection, a welded connection, a brazed connection or a combination thereof. The structured catalyst may comprise terminals physically and electrically connected to the structured catalyst in order to facilitate the electrical connection between the electrically conductive material and the at least two conductors. The term "mechanical connection" is meant to denote a connection where two components are held together mechanically, such as by a threaded connection or by clamping, so that a current may run between the components.

The electrically conductive materials placed in an array of electrically conductive materials may be electrically connected to each other. The connection between the two or more electrically conductive materials may be by mechanical connection, clamping, soldering, welding or any combination of these connection methods. Each electrically conductive material may comprise terminals in order to facilitate the electrical connections. The two or more electrically conductive materials may be connected to the power supply in serial or parallel connection. The electrical connection between the two or more electrically conductive materials is advantageously coherent and uniform along the connection surface between the two or more electrically conductive materials, so that the two or more electrically conductive materials act as a single coherent or consistently intra-connected material; hereby, uniform electrical conductivity throughout the two or more electrically conductive materials is facilitated. Alternatively, or additionally, the structured catalyst may comprise an array of electrically conductive materials that are not electrically connected to each other. Instead, two or more electrically conductive materials are placed together within the pressure shell, but not connected electrically to each other. In this case, the structured catalyst thus comprises electrically conductive materials connected in parallel to the power supply.

A ceramic coating, with or without catalytically active material, may be added directly to a metal surface of the electrically conductive material by wash coating. The wash coating of a metal surface is a well-known process; a description is given in e.g. Cybulski, A., and Moulijn, J. A., "Structured catalysts and reactors", Marcel Dekker, Inc, New York, 1998, Chapter 3, and references herein. The ceramic coat may be added to the surface of the electrically conductive material and subsequently the catalytically active material may be added; alternatively, the ceramic coat comprising the catalytically active material is added to the macroscopic structure or electrically conductive material. The ceramic coating may for example be an oxide comprising Al, Zr, Mg, Ce and/or Ca. Exemplary coatings are calcium aluminate or a magnesium aluminum spinel. Such a ceramic coating may comprise further elements, such as La, Y, Ti, K or combinations thereof. The ceramic coating is an electrically insulating material and will typically have a thickness in the range of around 100 µm, say 10-500 µm.

Extruding and sintering or 3D printing a macroscopic structure results in a uniformly and coherently shaped macroscopic structure, which can afterwards be coated with the ceramic coating.

The electrically conductive material and the ceramic coating may have been sintered in an oxidizing atmosphere in order to form chemical bonds between the ceramic coating and the electrically conductive material; this provides for an especially high heat conductivity between the electrically conductive material and the catalytically active material supported by the ceramic coating. Thereby, the structured catalyst is compact in terms of heat transfer to the active catalytic site, and a reactor system housing the structured catalyst may be compact and limited mainly by the rate of the chemical reaction.

In an embodiment, the structured catalyst has at least one electrically insulating part arranged to increase the current path between the conductors to a length larger than the largest dimension of the structured catalyst. The provision of a current path between the conductors larger than the largest dimension of the structured catalyst may be by provision of electrically insulating part(s) positioned between the conductors and preventing the current running through some part of the structured catalyst. Such electrically insulating parts are arranged to increase the current path and thus increase the resistance through the structured catalyst. Hereby, the current path through the structured catalyst can be e.g. more than 50%, 100%, 200%, 1000%, or even 10000% longer than the largest dimension of the structured catalyst.

Moreover, such electrically insulating parts are arranged to direct the current from one conductor, which is closer to the first end of the structured catalyst than to the second end, towards the second end of the structured catalyst and back to a second conductor closer to the first end of the structured catalyst than to the second end. Preferably, the current is arranged to run from the first end of the structured catalyst to the second and back to the first end. As seen in the figures, the first end of the structured catalyst is the top end thereof. The arrow indicated "z" in FIGS. 5-7 indicates a z-axis along the length of the structured catalyst. The principal current path throughout the structured catalyst will have a positive or negative value of z-coordinate of the accompanied current density vector along most of the length of the current path. By principal current path is meant the path of the electrons through a macroscopic structure of the structured catalyst with the highest current density. The principal current path can also be understood as the path having the minimum length through the macroscopic structure of the structured catalyst. Seen geometrically, the principal current path can be quantified as the largest current density vector within a plane perpendicular to the gas flow direction of a coherent section of the macroscopic structure. At the bottom of the structured catalyst, as shown in the figures, the current will turn, and here the z-coordinate of the accompanied current density vector will be zero.

As used herein, the term coherent section is meant to denote a cross-section area of the macroscopic structure wherein all walls of the coherent section are geometrically connected to one or more other walls of the coherent section within the same plane.

In an embodiment, the structured catalyst has at least one electrically insulating part arranged to direct a current through the structured catalyst in order to ensure that for at least 70% of the length of said structured catalyst, a current density vector of a principal current path has a non-zero component value parallel to the length of said structured catalyst. Thus, for at least 70% of the length of the structured catalyst, the current density vector will have a positive or negative component value parallel to the length of the structured catalyst. Thus, for at least 70%, e.g. for 90% or 95%, of the length of structured catalyst, viz. along the z-axis of the structured catalyst as seen in FIGS. 5 to 10, the current density vector of a principal current path will have a positive or negative value along the z-axis. This means that the current is forced from the first end of the structured catalyst towards the second end, and subsequently is forced towards the first end again. The temperature of the gas entering the first end of the structured catalyst and the endothermic reverse water gas shift reaction taking place over the structured catalyst absorbs heat from the structured catalyst. For this reason, the first end of the structured catalyst remains colder than the second end, and by ensuring that the current density vector of the principal current path has a non-zero component value parallel to the length of said structured catalyst, this takes place with a substantially continuously increasing temperature profile, which gives a controllable reaction front. In an embodiment the current density vector has a non-zero component value parallel to the length of said structured catalyst in 70% of the length of said structured catalyst, preferably 80%, more preferably 90%, and even more preferably 95%. It should be noted that the term "the length of the structured catalyst" is meant to denote the dimension of the structured catalyst in the direction of the gas flow. In the structured catalysts as shown in the figures, the length is the longitudinal direction, viz. the longest dimension thereof. This is indicated by the arrow denote z in some of the figures.

Non-limiting examples of insulating parts are cuts, slits, or holes in the structure. Optionally, a solid insulating material such as ceramics in cuts or slits in the structure can be used. In a case where the solid insulating material is a porous ceramic material, the catalytically active material may advantageously be incorporated in the pores, by e.g. impregnation. A solid insulating material within a cut or slit assists in keeping the parts of the structured catalyst on the sides of the cut or slit from each other. As used herein, the term "largest dimension of the structured catalyst" is meant to denote the largest inner dimension of the geometrical form taken up by the structured catalyst. If the structured catalyst is box-formed, the largest dimension would be the diagonal from one corner to the farthest corner, also denoted the space diagonal.

It should be noted that even though the current through the structured catalyst may be arranged to twist or wind its way through the structured catalyst due to the electrically insulating parts arranged to increase the current path, the gas passing through the reactor system is inlet at one end of the reactor system, passes over the structured catalyst once before being outlet from the reactor system. Inert material is advantageously present in relevant gaps between the structured catalyst and the rest of the reactor system to ensure that the gas within the reactor system passes over the structured catalyst and the catalyst material herein.

The length of the gas passage through the structured catalyst is suitably less than the length of the passage of current from one electrode through the structured catalyst and to the next electrode. The ratio of the length of the gas passage to the length of the current passage may be less than 0.6, or 0.3, 0.1, or even down to 0.002. The length of the gas passage is defined as the distance from the inlet for the feedstock, through the structured catalyst to the outlet for the product gas.

Typically, the structured catalyst has electrically insulating parts arranged to make the current path through the structured catalyst a zigzag path. Here, the terms "zigzag path" and "zigzag route" is meant to denote a path that has corners at variable angles tracing a path from one conductor to another. A zigzag path is for example a path going upwards, turning, and subsequently going downwards. A zigzag path may have many turns, going upwards and subsequently downwards many times through the structured catalyst, even though one turn is enough to make the path a zigzag path.

It should be noted that the insulating parts arranged to increase the current path are not necessarily related to the ceramic coating on the electrically conductive material; even though this ceramic coating is also considered electrically insulating, it does not change the length of the current path between the conductors connected to the electrically conductive material.

The macroscopic structure may have a plurality of parallel channels, a plurality of non-parallel channels and/or a plurality of labyrinthine channels, where the channels have walls defining the channels. Thereby, several different forms of the macroscopic structure can be used as long as the surface area of the structured catalyst exposed to the gas is as large as possible. In a preferred embodiment, the macroscopic structure has parallel channels, since such parallel channels render a structured catalyst with a very small pressure drop. In a preferred embodiment, parallel longitudinal channels are skewed in the longitudinal direction of the macroscopic structure. In this way, molecules of the gas flowing through the macroscopic structure will mostly tend to hit a wall inside the channels instead of just flowing straight through a channel without being in contact with a wall. The dimension of the channels should be appropriate in order to provide a macroscopic structure with a sufficient resistivity. For example, the channels could be quadratic (as seen in cross section perpendicular to the channels) and have a side length of the squares of between 1 and 3 mm; however, channels having a maximum extent in the cross section of up to about 4 cm are conceivable. The walls may e.g. have a thickness of between 0.2 and 2 mm, such as about 0.5 mm, and the ceramic coating supported by the walls has a thickness of between 10 μm and 500 μm, such as between 50 µm and 200 µm, such as 100 µm. In another embodiment, the macroscopic structure of the structured catalyst is cross-corrugated.

In general, when the macroscopic structure is extruded or 3D printed, the pressure drop from the inlet to the outlet of the reactor system may be reduced considerably compared to a reactor where the catalyst material is in the form of pellets.

Suitably, the reactor system further comprises a bed of a second catalyst material upstream the structured catalyst within the pressure shell. Here, the term "upstream" is seen from the flow direction of the feedstock. Thus, the term "upstream" is here meant to denote that the feedstock is directed through the bed of second catalyst material prior to reaching the structured catalyst. This provides for a situation where the second catalyst material can be arranged for pre conditioning the feed stream. No specific heating needs to be provided to the bed of second catalyst material; however, the bed of second catalyst material may be heated indirectly if it is in close proximity to the structured catalyst. In order to clarify the terminology used here, it is noted that the term "structured catalyst" may also be denoted "a first catalyst material" to distinguish it from the second and/or third and/or fourth catalyst material. In one embodiment the second catalyst material is in the form of particles comprising a support material coated with a catalytically active material capable of catalysing both the reverse water gas shift reaction and the methanation reaction. In one embodiment, the catalysing capacity of the second catalyst material is sufficient to bring the methanation reaction to an equilibrium. In this situation, no further methanation will take place in the structured catalyst, but rather the reverse methanation reaction will take place in the whole of the structured catalyst, i.e. the reactions taking place in the whole of the structured catalyst are endothermic. In connection with the present invention the phrase "the methanation reaction take place" in relation to the structured catalyst means that during the passage of the gas from the first end to the second end of the structured catalyst the methanation reaction will proceed in both the forward and the reverse direction or only in the reverse direction as may be the case for the embodiment discussed in this paragraph. In this specific embodiment, the first exothermic reaction zone is placed inside of the bed of the second catalyst material. In an alternative embodiment, the second catalyst is in the form of a non-heated structured catalyst.

In an embodiment, the first catalyst material has different sections of active material. So the most upstream part of the catalyst material has a principal reactivity for one type of reactions, while the second part has another. Specifically, the relative activities for methanation and reverse water gas shift reactions can be different along the first catalyst material.

The reactor system may further comprise a third catalyst material in the form of catalyst pellets, extrudates or granulates loaded into the channels of the macroscopic structure. In this embodiment, the reactor system will thus have a catalytically active material in the coating of the macroscopic structure as well as a third catalyst material in the form catalyst pellets, extrudates or granulates within the channels of the macroscopic structure. The pellets are e.g. prepared in a dimension to loosely match the size of channels to form a single string of pellets stacked upon each other within a channel of the macroscopic structure. Alternatively, the pellets, extrudates or granulates may be prepared in a dimension significantly smaller than the channel size to form a packed bed inside each channel. As used herein, the term "pellet" is meant to denote any well-defined structure having a maximum outer dimension in the range of millimeters or centimeters, while "extrudate" and "granulate" are meant to define a catalyst material with a maximum outer dimension defined within a range.

A bed of fourth catalyst material may be placed within the pressure shell and downstream the structured catalyst. Such fourth catalyst material may be in the form of catalyst pellets, extrudates or granulates.

Therefore the first, second, third, and fourth catalyst material may be catalyst materials suitable for the methanation and reverse water gas shift reaction. In an embodiment the second, third, and fourth catalyst material may be catalyst material is $Ni/MgAl_2O_4$. Other potential catalyst materials comprise noble metals including Ru, Rh, and Ir and typical carrier materials known from the art such as Calcium Aluminate. In a configuration where a combination of the second, third, and fourth catalyst material is included in the reactor system, the catalyst of each catalyst material can be different.

The geometric surface area of the macroscopic structure may be between 100 and 3000 $m^2/m^3$, such as between 500 and 1100 $m^2/m^3$. Typically, the material of the macroscopic structure is chosen as a material arranged to supply a heat flux of 500 $W/m^2$ to 100.000 $W/m^2$, preferably 500 $W/m^2$ to 50.000 $W/m^2$ by resistance heating of the material. Preferably, resistance heating of the material supplies a heat flux of between 5 $kW/m^2$ and 12 $kW/m^2$, for example between 8 $kW/m^2$ and 10 $kW/m^2$ in average across the geometric surface. The heat flux is given as heat per geometric surface area of the surface exposed to the gas.

In an embodiment the structured catalyst comprises a first part arranged to generate a first heat flux and a second part arranged to generate a second heat flux, where the first heat flux is lower than the second heat flux, and where the first part is upstream the second part. Here, the term "the first part is upstream the second part" is meant to denote, that the gas fed into the reactor system reaches the first part before the gas reaches the second part. The first part and second part of the structured catalyst may be two different macroscopic structures supporting ceramic coating supporting catalytically active material, where the two different macroscopic structures may be arranged to generate different heat fluxes for a given electrical current and voltage. For instance, the first part of the structured catalyst may have a large surface area, whilst the second part of the structured catalyst has a smaller surface area. This may be accomplished by providing a structured catalyst in the second part having a smaller cross sectional area than the cross sectional area of the first part. Alternatively, the current path through the first part of the structured catalyst may be more straight than the current path through the second part of the structured catalyst, thus making the current twist and wind more through the second part than through the first part of the structured catalyst, whereby the current generates more heat in the second part of the structured catalyst than in the first part. As mentioned before, slits or cuts in the macroscopic structure may make the current path zigzag through the macroscopic structure. It should be noted, that the first and second part of the structured catalyst may experience different electrical currents and voltages in order to be able to supply different heat fluxes. However, the different heat fluxes of the first and second part may also be achieved by supplying the same electrical current and voltage through/over the first and second part, due to different physical properties of the first and second part as indicated above. In a further embodiment, the structured catalyst comprises a third part arranged to generate a third heat flux, where the third heat flux is lower than the first and/or the second heat flux, and where the third part is downstream the first and/or second part.

In an embodiment of the reactor system of the invention, the catalytically active material is provided in a zone disposed closest to the second end of said structured catalyst and has an extension of 10-100%, preferably 30-100%, and more preferably 50-100% of the length of the structured catalyst from its first to its second end. The predetermined temperature range of the gas exiting the pressure shell/the reactor system is the range from 500 to 1300° C. The product gas outlet temperature from the structured catalyst is measured directly beneath or on the most downstream surface of the structured catalyst. Measuring technology can be thermocouples (by voltage drop), resistance temperature detectors or infrared detection. The measuring point can be separated from the structured catalyst and be embedded in downstream inert/catalyst, or be directly on the surface with an insulating surface coverage.

The structured catalyst within said reactor system suitably has a ratio between the area equivalent diameter of a horizontal cross section through the structured catalyst and the height of the structured catalyst in the range from 0.1 to 2.0. The area equivalent diameter of the cross section through the reactor system is defined as the diameter of a circle of equivalent area as the area of the cross section. When the ratio between the area equivalent diameter and the height of the structured catalyst is between 0.1 and 2.0, the pressure shell housing the structured catalyst may be relatively small compared to other reactor systems for endothermic reactions such as a current tubular reformer for steam methane reforming.

Typically, the gas flows through the reactor system in an upflow or downflow direction, so that the gas flows through channels in the structured catalyst along the height thereof. When the structured catalyst comprises a number of or an array of macroscopic structures, the individual macroscopic structures within the array may be placed side by side, on top of each other or in a combination thereof. It is stressed that, when the structured catalyst comprises more than one macroscopic structures, the dimensions of the structured catalyst are the dimensions of the more than one macroscopic structures. Thus, as an example, if the structured catalyst comprises two macroscopic structures, each having the height h, put on top of each other, the height of the structured catalyst is 2 h.

The volume of the structured catalyst is chosen in consideration of the desired feed conversion and/or temperature out of the reactor system correlated to the heat generation capacity of the electrically conductive material.

Suitably, the height of the reactor system is between 0.5 and 7 m, more preferably between 0.5 and 3 m. Exemplary values of the height of the reactor system is a height of less than 5 meters, preferably less than 2 m or even 1 m. The dimensions of the reactor system and of the structured catalyst within the reactor system are correlated; of course, the pressure shell and heat insulation layer render the reactor system somewhat larger than the structured catalyst itself.

In an embodiment, the first product gas comprises methane such as minimum 0.5% by volume or minimum 1.0% by volume. In other embodiments, the product gas comprises methane with a maximum 5% or preferably less than 3% per volume.

In an embodiment the $H_2/CO$ ratio of the product gas is between 1.5 and 5.0 such as between 2.0 and 3.0.

In one embodiment the product gas is cooled in a waste heat boiler in which the cooling takes place by evaporation of water to steam. The steam can be used as means to produce electricity in a turbine. Alternatively, the steam can be used to produce hydrogen by electrolysis, such as by solid oxide electrolysis.

The reactor system may further comprise an upgrading unit arranged to receive the product gas and separate it into an upgraded synthesis gas stream and an off-gas stream.

The invention further relates to a process for converting a feedstock comprising $CO_2$ and $H_2$ to a first product gas comprising CO in a reactor system comprising a pressure shell housing a structured catalyst comprising a macroscopic structure of electrically conductive material and a catalytically active material; wherein said reactor system is provided with heat insulation between said structured catalyst and said pressure shell; said process comprising the steps of:
  providing a pressurized feedstock;
  supplying said pressurized feedstock to said pressure shell through an inlet positioned so that said feedstock enters said structured catalyst in a first end of said structured catalyst;
  using a catalytically active material capable of catalysing both the reverse water gas shift reaction and a methanation reaction;
  allowing the feedstock to undergo a reverse water gas shift reaction over the structured catalyst under such temperature and pressure that both the reverse gas shift reaction and the methanation reaction take place;
  outletting a product gas from said pressure shell, wherein said product gas exits said structured catalyst from a second end of said structured catalyst;
  supplying electrical power via electrical conductors connecting an electrical power supply placed outside said pressure shell to said structured catalyst, allowing an electrical current to run through said macroscopic structure, thereby heating at least part of the structured catalyst to a temperature of at least 500° C., wherein said at least two conductors are connected to the structured catalyst at a position on the structured catalyst closer to said first end of said structured catalyst than to said second end of said structured catalyst, and wherein the structured catalyst is constructed to direct an electrical current to run from one conductor substantially to the second end of the structured catalyst and return to a second of said at least two conductors, thereby heating at least part of the structured catalyst to a temperature sufficient for said feedstock to undergo the reverse water gas shift reaction over the structured catalyst,
  outletting a first product gas comprising CO from the reactor system.

All details of the system given above are—wherever possible—relevant to the process described above.

In an embodiment of the process of the invention, the structured catalyst has a first reaction zone disposed closest to the first end of said structured catalyst, wherein the first reaction zone has an overall exothermic reaction, and a second reaction zone disposed closest to the second end of said structured catalyst, wherein the second reaction zone has an overall endothermic reaction. Preferably, said first reaction zone has an extension of 5 to 60% of the length of the structured catalyst from its first to its second end.

In an embodiment of the process of the invention, the concentration of methane is higher in the partly catalyzed feedstock inside at least a part of the structured catalyst than in the feedstock and in the first product gas.

In an embodiment of the process of the invention, the temperature of the structured catalyst is continuously increasing from the first end to the second end of the structured catalyst.

In one aspect, the feedstock is pressurised to a pressure between 2 and 30 bar. The feedstock may be pressurised to a pressure between 30 and 200 bar. Suitably, at least part of the structured catalyst is heated to a temperature of at least 500° C., preferably at least 700° C. The maximum temperature to which the structured catalyst is heated is ca. 1400° C.

One aspect of the process further comprises the step of inletting a cooling gas through an inlet through the pressure shell in order to allow said cooling gas to flow over at least one conductor.

The process may further comprise the step of feeding the first product gas comprising CO to an upgrading unit and separating it into an upgraded gas stream and an off-gas stream. The upgrading unit may be arranged so that the off-gas stream is compressed and recycled and mixed with the supply of feedstock before being passed over the structured catalyst.

The upgrading unit may comprise a flash separation unit, a pressure swing adsorption (PSA) unit, a temperature swing adsorption (TSA) unit, a membrane unit, $CO_2$ separation or a combination of $CO_2$ separation and a cold box. A cold box is defined as a cryogenic process for separation of a mixture of $H_2$, CO, and other gasses into a somewhat pure stream of CO, a somewhat pure stream of $H_2$, and a balancing stream of what remains from the feed stream.

By flash separation is meant a phase separation unit, where a stream is divided into a liquid and gas phase according to the thermodynamic phase equilibrium at a given temperature.

By $CO_2$ separation is meant a unit utilizing a process, such as chemical absorption, for removing $CO_2$ from the process gas. In chemical absorption, the $CO_2$ containing gas is passed over a solvent which reacts with $CO_2$ and in this way binds it. The majority of the chemical solvents are amines, classified as primary amines as monoethanolamine (MEA) and digylcolamine (DGA), secondary amines as diethanolamine (DEA) and diiso-propanolamine (DIPA), or tertiary amines as triethanolamine (TEA) and methyldiethanolamine (MDEA), but also ammonia and liquid alkali carbonates as $K_2CO_3$ and $NaCO_3$ can be used.

By swing adsorption, a unit separating heavy gases (such as $CO_2$) from lighter gases (such as $H_2$) adsorption is meant. In this type of equipment, a dynamic equilibrium between adsorption and desorption of the heavy gases over an adsorption material is established. The adsorption can be caused by steric, kinetic, or equilibrium effects. The exact mechanism will be determined by the used adsorbent and the equilibrium saturation will be dependent on temperature and pressure. Typically, the adsorbent material is treated in the process gas until near saturation and will subsequently need re-generation. The regeneration can be done by changing pressure or temperature. In practice, this means that a two reactor process is used, saturating the adsorbent at high pressure or low temperature initially in one reactor and then switching reactor, now desorbing the heavy gases from the same reactor by decreasing the pressure or increasing the temperature.

By membrane is meant separation over an at least partly solid barrier, such as a polymer, where the transport of individual gas species takes place at different rates de-fined by their permeability. This allows for up-concentration, or dilution, of a component in the retentate of the membrane.

By cryogenic separation is meant a process utilizing the phase change of different species in the gas to separate individual components from a gas mixture by controlling the temperature.

In an embodiment of the process of the invention, the $CO_2$ and $H_2$ of the feedstock is subjected to a first compression step prior to supplying the pressurized feedstock to the pressure shell, and subsequent to outletting the first product gas from the reactor system, the first product gas is subjected to a second compression step. Preferably, the $CO_2$ and $H_2$ of the feedstock is pressurized to a pressure of between 2 and 30 bar in the first compression step. In one embodiment, the $CO_2$ and $H_2$ of the feedstock may be pressurized as separate streams, mixed to form the feedstock and then supplied to the pressure shell. In another embodiment, the $CO_2$ and $H_2$ of the feedstock are mixed and pressurized as a mixed stream to form the pressurized feedstock, which is then supplied to the pressure shell.

When the first product gas is intended for use in a downstream process, this process typically will have a demand for the required pressure of the CO comprising product gas of 20-95 barg for use as a feed gas for methanol synthesis, and a demand for the required pressure of 20-40 barg for use as a feed for a Fischer-Tropsch process. In this situation, it is according to a preferred embodiment of the process of the invention preferred to compress the feedstock only to the lowest possible pressure level required to efficiently facility the process of the invention and then compress the first product gas to the pressure level required for the downstream process. In an embodiment the pressure after the first compression step is 5-15 barg, while the compression after the second compression step is matched to the downstream process. Keeping a relative low pressure in the process of the invention has the advantage that the effective formation of methane is limited due to the thermodynamic equilibrium. Secondly, less molecules will need to be compressed in this layout, as the gas amount of gas molecules effectively can be decreased downstream the reactor system of the invention by condensing the steam formed through the reverse water gas shift reaction and methanation reactions. This feature results in less total energy use of the first and second compression step compared to a case with only a first compression step. Compression in the first step will however always need to be large enough to compensate for the pressure drop through equipment and piping used to facilitate the process of the invention.

A method for rapidly switching a reverse water gas shift reaction of a feedstock comprising $CO_2$ and $H_2$ in a reactor system as set out herein, from a first steady-state reaction condition (A) to a second steady-state reaction condition (B) or vice-versa, is therefore provided.

Reaching a steady state condition is defined as when central process parameters (such as feed flow, outlet temperature, and reactant conversion) have reached a value within ±15% of the average process value for the given process parameter for the subsequent hour.

A condition of the invention, A or B, involves a state where the catalyst of the system is heated by an electrical power balanced to heat the product gas outlet temperature from the structured catalyst to a temperature between 500 and 1300° C. at a pressure between 5 barg and 150 barg with a feedstock comprising $CO_2$ and $H_2$, and any of water, carbon oxide, nitrogen, or argon in a total flow rate of 300 Nm³/h to 100 000 Nm³/h. When the feedstock passes the monolith, it will react towards equilibration of the reaction.

The term "vice versa" is used to mean that the method applies equally when switching from the first reaction condition (A) to the second reaction condition (B) as when switching from the second reaction condition (B) to the first reaction condition (A). Notably, a switch from condition A to B is considered completed when the process values of the system have reached within 85% of steady state conditions.

The reactor system is as described above; i.e. it comprises a pressure shell housing a structured catalyst arranged to catalyze the reaction of a feedstock comprising $CO_2$ and $H_2$, said structured catalyst comprising a macroscopic structure of an electrically conductive material, where said macroscopic structure may support a ceramic coating, and where said ceramic coating may support a catalytically active material, and wherein said reactor system is provided with heat insulation between said structured catalyst and said pressure shell. All details described above in relation to the reactor system are relevant for the present technology.

The method of this aspect of the invention comprises the steps of:

in said first steady-state reaction condition (A):
  supplying said feedstock to the reactor system in a first total flow, and
  supplying a first electrical power via electrical conductors connecting an electrical power supply placed outside said pressure shell to said structured catalyst, thereby allowing a first electrical current to run through said electrically conductive material,
thereby heating at least part of the structured catalyst to a first temperature at which said feedstock is converted to a first product gas over said structured catalyst under said first steady-state reaction conditions (A); and said first product gas is outlet from the reactor system;
and, in said second steady-state reaction condition (B):
  supplying said feedstock to the reactor system in a second total flow,
  supplying a second electrical power via electrical conductors connecting an electrical power supply placed outside said pressure shell to said structured catalyst, thereby allowing a second electrical current to run through said electrically conductive material,
thereby heating at least part of the structured catalyst to a second temperature; at which said feedstock is converted to a second product gas over said structured catalyst under said second steady-state reaction conditions (B); and said second product gas is outlet from the reactor system;
To achieve the first and second steady-state reaction conditions (A) and (B), the second electrical power is higher than said first electrical power; and/or said second total flow is higher than said first total flow.

Notably, an increase in total flow will increase the input of cool feedstock, thus cooling the structured catalyst, and reducing the reactivity so that second steady-state reaction condition (B) is achieved. A significant change in flow will change the energy required for the process.

A change in total flow may include a change in total flow with no compositional change or a change in the composition, such as increasing recycle flow or changing part of the feedstock.

In one embodiment, the ratio of total gas feed flow in said first reaction condition A to said second reaction condition B (A:B) is at least 1:10. Switching between condition A and B consequently allows for significant increased/decreased production of product gas. This is advantageous when the invention is used for e.g. energy storage where excess electric energy from the energy grid is available and in this way can be stored as chemical energy, or vice versa for increasing availability of electric energy in the grid when it is needed elsewhere. Additionally, the embodiment allows for using the invention to supply large amounts of product gas in periods where downstream processes demands it, while having the invention operating in a standby condition otherwise. This is advantageously if there is no continuous demand for the product gas.

In another embodiment, the product gas outlet temperature from the structured catalyst in reaction condition B is between 50° C. to 800° C. higher, such as between 100° C. to 500° C. higher, preferably between 150° C. to 400° C. higher, than the product gas outlet temperature from the structured catalyst in reaction condition A. This allows for rapidly starting up the reactor system from a cold state to operating conditions. This is advantageous in the situation of system start-up, where the start-up procedure involves steps including:

Heating process equipment in a non-condensing gas to a temperature above the condensation point of the steady state conditions of the plant at full operating capacity,
Pressurising the feedstock constituents,
Feeding feedstock constituents to the reactor system while applying a first electrical power,
Switching to a higher operating temperature by applying a second electrical power.

In this way, all steps of the start-up procedure are relatively fast.

The product gas outlet temperature from the structured catalyst in reaction condition B is typically no more than 50° C. higher than the product gas outlet temperature from the structured catalyst in reaction condition A. This allows for rapidly changing the between condition A and B, without significantly changing the product gas composition from the system. In this way, the demand for the product gas for downstream processes of the reactor system can easily be supplied in different quantities without interfering significantly in the chemical environment of these.

In one embodiment, the switch between reaction condition A and B includes a gradual change of the total gas feed flow from said first total flow to said second total flow and simultaneous gradual change of the applied electrical potential over said electrically conductive material from said first to said second electrical power. In this way, the product gas composition can be held almost constant also during the transition stage. In an embodiment, the gradual changes are made in such a way where the flow is increased in small steps while increasing the electrical power to maintain an almost constant product gas outlet temperature from the structured catalyst.

In an embodiment, the reactor system further comprises a control system arranged to control the electrical power supply to ensure that the temperature of the gas exiting the pressure shell lies in a predetermined range and/or to ensure that the conversion of the feedstock lies in a predetermined range. The control of the electrical power supply is the control of the electrical output from the power supply. The control of the electrical power supply may e.g. be carried out as a control of the voltage and/or current from the electrical power supply, as a control of whether the electrical power supply is turned on or off or as a combination hereof. The power supplied to the structured catalyst can be in the form of alternating current or direct current.

According to one embodiment, a proportional-integral-derivative (PID) controller controls the electrical potential based on feedback reading of the process value of product gas outlet temperature from the structured catalyst.

The method described herein allows rapid switching between conditions A and B. Suitably, therefore, the switch between reaction conditions A and B takes place over a period of less than 3 hours, such as less than 2 hours, such as less than 60 min, preferably less than 30 min, and even more preferably less than 15 min.

In one embodiment, the switch between reaction condition A and B involves supplying a second electrical power to the structured catalyst. This suitably occurs while keeping the total flow essentially constant.

In one aspect, the switch between reaction condition A and B comprises a transition state between said reaction conditions A and B; said transition state comprising a first period in which the electrical power is switched off, followed by a second period in which said second electrical power of condition B is supplied to the structured catalyst. This allows for faster establishment of a steady state.

In one aspect, the switch between reaction condition A and B comprises a transition state between said reaction conditions A and B; said transition state comprising a first period in which a third electrical power is supplied to the structured catalyst, followed by a second period in which said second electrical power of condition B is supplied to the structured catalyst, said third electrical power being higher than the second electrical power. This allows for faster establishment of a steady state.

The process may comprise further steps carried out on the product gas, such as purification, pressurization, heating, cooling, etc. to provide the final product gas for an application downstream the reactor system of this invention.

Moreover, it should be noted that the order in which the steps of the process are written are not necessarily the order in which the process steps take place, in that two or more steps may take place simultaneously, or the order may be different that indicated above.

In an embodiment, the process comprises the step of pressurizing the feedstock upstream the pressure shell to a pressure of up to at least 2 bar. The chosen operating pressure is defined by the endothermic reaction and the integration of the reactor in the surrounding process steps. In a preferable embodiment, pressurizing the feedstock is done by using a pump for liquid constituents of the feedstock, such as water, while a compressor is used for gaseous constituents, such as carbon dioxide and hydrogen. A mixer and/or preheater(s) can be included downstream the pressurization equipment to provide the desired reaction mixture and inlet temperature for the reactor system.

In an embodiment of the process according to the invention, the temperature of the feed gas let into the reactor system is between 100° C. and 400° C.

In an embodiment of the process of the invention, the structured catalyst is heated so that the maximum temperature of the structured catalyst lies between 500° C. and 1300° C. The used temperature will be dependent on the endothermic reaction. The maximum temperature of the structured catalyst depends upon the material of the electrically conductive material; thus, if the electrically conductive material is of FeCrAlloy, which melts at a temperature of between 1380° C. and 1490° C. (depending on the actual alloy), the maximum temperature should be somewhat below the melting point, such as at about 1300° C. if the melting point of the electrically conductive material is at about 1400° C., as the material will become soft and ductile when approaching the melting point. The maximum temperature may additionally be limited by the durability of the catalyst material, the coating and the catalytically active material.

In an embodiment the process according to the invention further comprises the step of inletting a cooling gas through an inlet through the pressure shell in order to allow a cooling gas to flow over at least one conductor and/or fitting. The cooling gas may advantageously be hydrogen, carbon dioxide, nitrogen, or any other gas suitable for cooling the area or zone around the at least one conductor. A part of the feedstock may be fed to the pressure shell as the cooling gas.

In an embodiment according to the invention, the process further comprises the step of inletting a cooling gas through an inlet through the pressure shell in order to allow a cooling gas to flow over at least one conductor and/or fitting. The cooling gas may be any appropriate gas; examples of such gasses are hydrogen, nitrogen, methanol, methane or mixtures thereof. The cooling gas may flow through the conductor(s) and cool it (them) from within; in this case, the conductor(s) need(s) to be hollow to accommodate the cooling gas flowing within it/them.

The catalyst material for the reaction may be $Ni/Al_2O_3$, $Ni/ZrO_2$, $Ni/MgAl_2O_3$, $Ni/CaAl_2O_3$, $Ru/MgAl_2O_3$, or $Rh/MgAl_2O_3$. The catalytically active material may be Fe, Ga, Ni, Ru, Rh, Ir, or a combination thereof, while the ceramic coating may be $Al_2O_3$, $ZrO_2$, $MgAl_2O_3$, $CaAl_2O_3$, or a combination therefore and potentially mixed with oxides of Y, Ti, La, or Ce. The maximum temperature of the reactor may be between 500-1300° C. The pressure of the feedstock may be 2-180 bar, preferably about 10 bar or alternatively 25 bar. In an embodiment, said macroscopic structure is made of an alloy of Fe Cr Al, supporting a ceramic coating of a $ZrO_2$ and $MgAl_2O_4$ mixture, with Ni as catalytically active material.

In a preferential embodiment, the reactor has a second catalyst material of $Ni/MgAl_2O_4$, a first catalyst material of where said macroscopic structure is made of an alloy of Fe Cr Al, supporting a ceramic coating of a $ZrO_2$, with Ni as catalytically active material, and a third catalyst material of $Ni/CaAl_2O_4$.

DETAILED DESCRIPTION OF THE FIGURES

Throughout the Figures, like reference numbers denote like elements.

FIG. 1a shows a cross section through an embodiment of a reactor system 100 according to the invention. The reactor system 100 comprises a structured catalyst 10, arranged as an array of macroscopic structures 5. Each macroscopic structure 5 in the array is coated with a ceramic coating impregnated with catalytically active material. The reactor system 100 moreover comprises conductors 40, 40' connected to a power supply (not shown in the Figures) and to the structured catalyst 10, viz. the array of macroscopic structures. The conductors 40, 40' are led through the wall of a pressure shell 20 housing the structured catalyst and through insulating material 30 on the inner side of the pressure shell, via fittings 50. The conductors 40' are connected to the array of macroscopic structures 5 by conductor contact rails 41.

In an embodiment, the electrical power supply supplies a voltage of 26V and a current of 1200 A. In another embodiment, the electrical power supply supplies a voltage of 5V and a current of 240 A. The current is led through electrical conductors 40, 40' to conductor contact rails 41, and the current runs through the structured catalyst 10 from one conductor contact rail 41, e.g. from the conductor contact rail seen to the left in FIG. 1a, to the other conductor contact rail 41, e.g. the conductor contact rail seen to the right in FIG. 1a. The current can be both alternating current, and e.g. run alternating in both directions, or direct current and run in any of the two directions.

The macroscopic structures 5 are made of electrically conductive material. Especially preferred is the alloy kanthal consisting of aluminum, iron and chrome. The ceramic coating, e.g. an oxide, coated onto the structure catalysts 5 is impregnated with catalytically active material. The conductors 40, 40' are made in materials like iron, aluminum, nickel, copper or alloys thereof.

During operating, a feedstock comprising $CO_2$ and $H_2$ enters the reactor system 100 from above as indicated by the arrow 11. Product gas comprising CO exits the reactor system from the bottom thereof as indicated by the arrow 12.

Figure 1B:
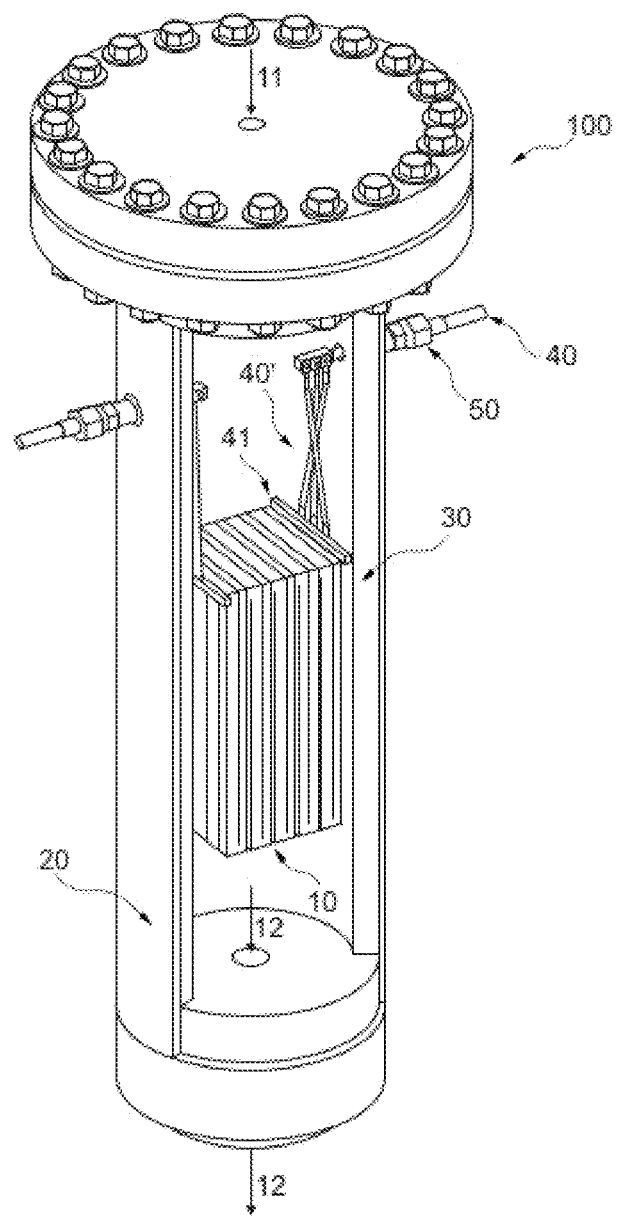
FIG. 1b shows the reactor system of FIG. 1a with a part of the pressure shell and heat insulation layer removed.
Figure 2:
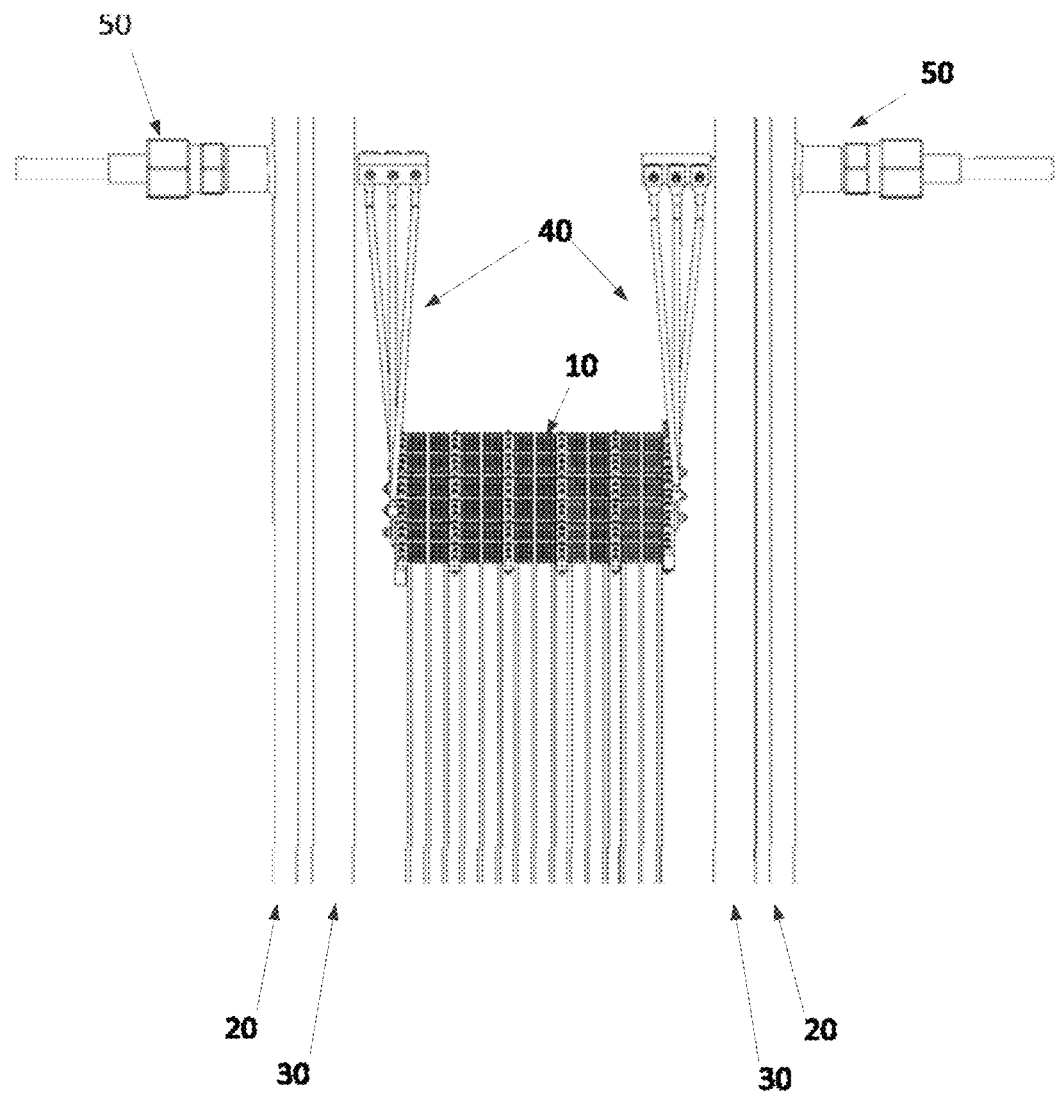
FIG. 2 is an enlarged view of a part of the reactor system.

FIG. 1b shows the reactor system 100 of FIG. 1a with a part of the pressure shell 20 and heat insulation 30 layer removed and FIG. 2 is an enlarged view of a part of the reactor system 100. In FIGS. 1b and 2 the connections between conductors 40' and conductor contact rails 41 are shown more clearly than in FIG. 1a. Moreover, it is seen that the conductors 40 are led through the walls of the pressure shell in a fitting 50, and that the one conductor 40 is split up into three conductors 40' within the pressure shell. It should be noted, that the number of conductors 40' may be any appropriate number, such as smaller than three or even larger than three.

In the reactor system shown in FIGS. 1a, 1b and 2, the conductors 40, 40' are led through the wall of a pressure shell 20 housing the structured catalyst and through insulating material 30 on the inner side of the pressure shell, via fittings 50. Feedstock for the reverse water gas shift reaction is inlet into the reactor system 100 via an inlet in the upper side of the reactor system 100 as shown by the arrow 11, and converted product gas exits the reactor system 100 via an outlet in the bottom of the reactor system 100 as shown by the arrow 12. Moreover, one or more additional inlets (not shown in FIGS. 1a to 2) advantageously exist close to or in combination with the fittings 50. Such additional inlets allow a cooling gas to flow over, around, close to, or inside at least one conductor within the pressure shell to reduce the heating of the fitting. The cooling gas could e.g. be hydrogen, nitrogen, methane or mixtures thereof. The temperature of the cooling gas at entry into the pressure shell may be e.g. about 100° C.

In the reactor system 100 shown in FIGS. 1a to 2, inert material (not shown in FIGS. 1a-2) is advantageously present between the lower side of the structured catalyst 10 and the bottom of the pressure shell. Moreover, inert material is advantageously present between the outer sides of the structured catalyst 10 of macroscopic structures 5 and the insulating material 30. Thus, one side of the insulating material 30 faces the inner side of the pressure shell 20 and the other side of the insulating material 30 faces the inert material. The inert materiel is e.g. ceramic material and may be in the form of pellets. The inert material assists in controlling the pressure drop across the reactor system 100 and in controlling the flow of the gas through the reactor system 100, so that the gas flows over the surfaces of the structured catalyst 10.

Figure 3A:
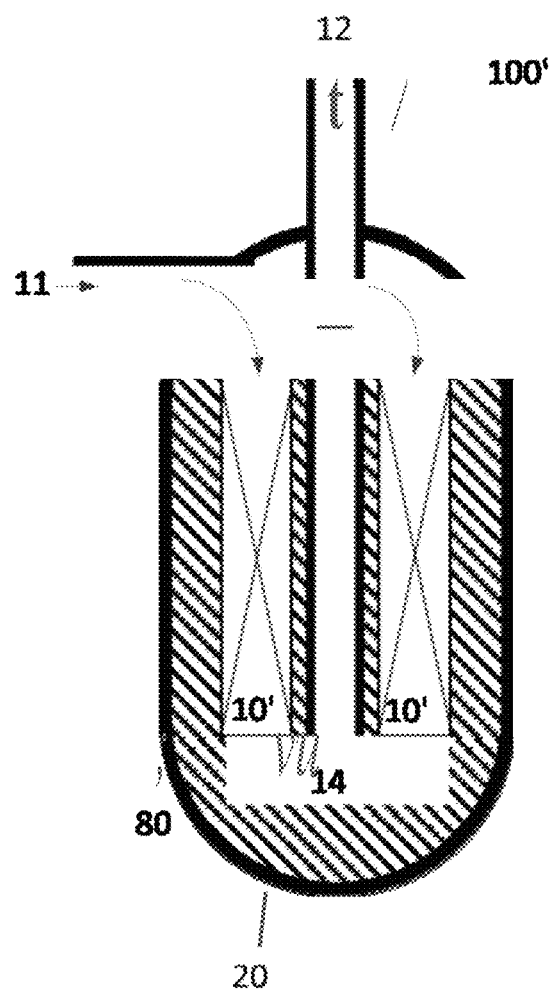
FIGS. 3a and 3b show schematic cross sections through an embodiment of the inventive reactor system comprising a structured catalyst.
Figure 3B:
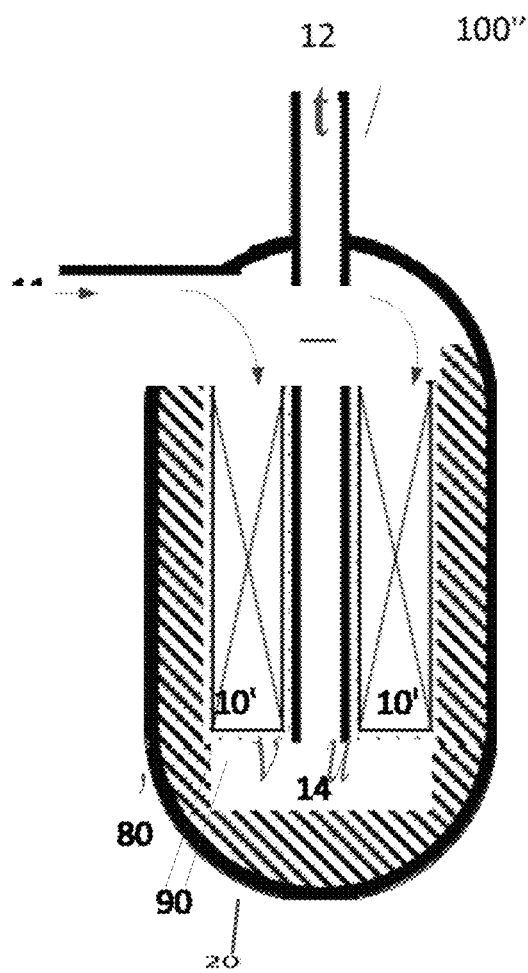

FIGS. 3a and 3b show schematic cross sections through an embodiment of the inventive reactor system 100', 100" comprising a structured catalyst 10'. The structured catalyst 10' may consist of a single macroscopic structure with ceramic coating supporting catalytically active material or it may contain two or more macroscopic structures. Each of the reactor systems 100', 100" comprises a pressure shell 20 and a heat insulation layer 80 between the structured catalyst 10' and the pressure shell 20. Inert material 90 can be used to fill the gap between the structured catalyst 10' and the heat insulation layer or the pressure shell 20. In FIGS. 3a and 3b, the inert material 90 is indicated by dotted area; the inert material 90 may be in any appropriate form, e.g. in the form of inert pellets, and it is e.g. of ceramic material. The inert material 90 assists in controlling the pressure drop through the reactor system and in controlling the flow of the gas through the reactor system. Moreover, the inert material typically has a heat insulating effect.

From FIGS. 3a and 3b it is seen that the reactor systems 100', 100" further comprise an inner tube 15 in heat exchange relationship with the structured catalyst 10'. The inner tube 15 is adapted to withdraw a product gas from the structured catalyst 10' so that the product gas flowing through the inner tube or tubes is in heat exchange relationship with the gas flowing over the structured catalyst; however, the inner tube 15 is electrically insulated from the structured catalyst 10' by either a heat insulation layer 80, inert material 90, a gap, or a combination. This is a layout which is denoted a bayonet reactor system. In this layout, the product gas within the inner tube assists in heating the process gas flowing over the macroscopic structure. In the layouts shown in FIGS. 3a and 3b, the feedstock enters the reactor system 100', 100" as indicated by the arrow 11, and continues into the structured catalyst 10' as indicated by the arrows 13. During the passage of the feedstock over the structured catalyst 10', it undergoes the reverse water gas shift reaction. The gas exiting the structured catalyst 10' is at least partly converted to CO. The at least partly converted gas flows from the structured catalyst 10' into the inner tube 15 as indicated by the arrows 14, and exits the inner tube as indicated by the arrows 12. Even though the heat insulation layer 80 is present between the inner tube 15 and the structured catalyst 10', some heat transfer will take place from the gas within the inner tube 15 and the gas within the structured catalyst 10' or upstream the structured catalyst 10'. In the embodiments shown in FIGS. 3a and 3b, the feedstock flow downwards through the structured catalyst 10' and upwards through the inner tube 15; however, it is conceivable that the configuration was turned upside-down so that the feedstock would flow upwards through the structured catalyst 10' and downwards through the inner tube 15.

Figure 4:
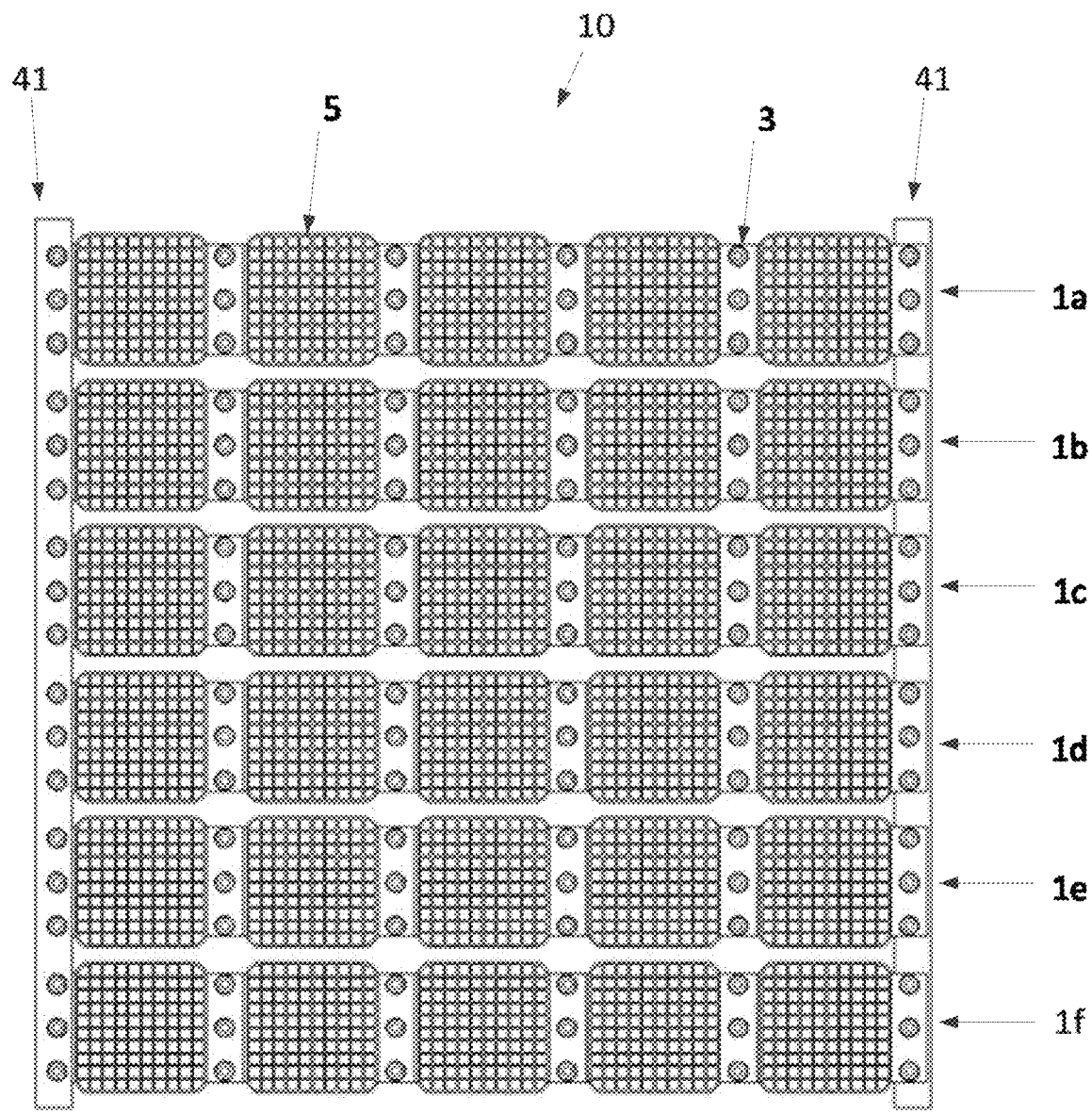
FIGS. 4 and 5 show an embodiment of a structured catalyst with an array of macroscopic structures as seen from above and from the side, respectively.
Figure 5:
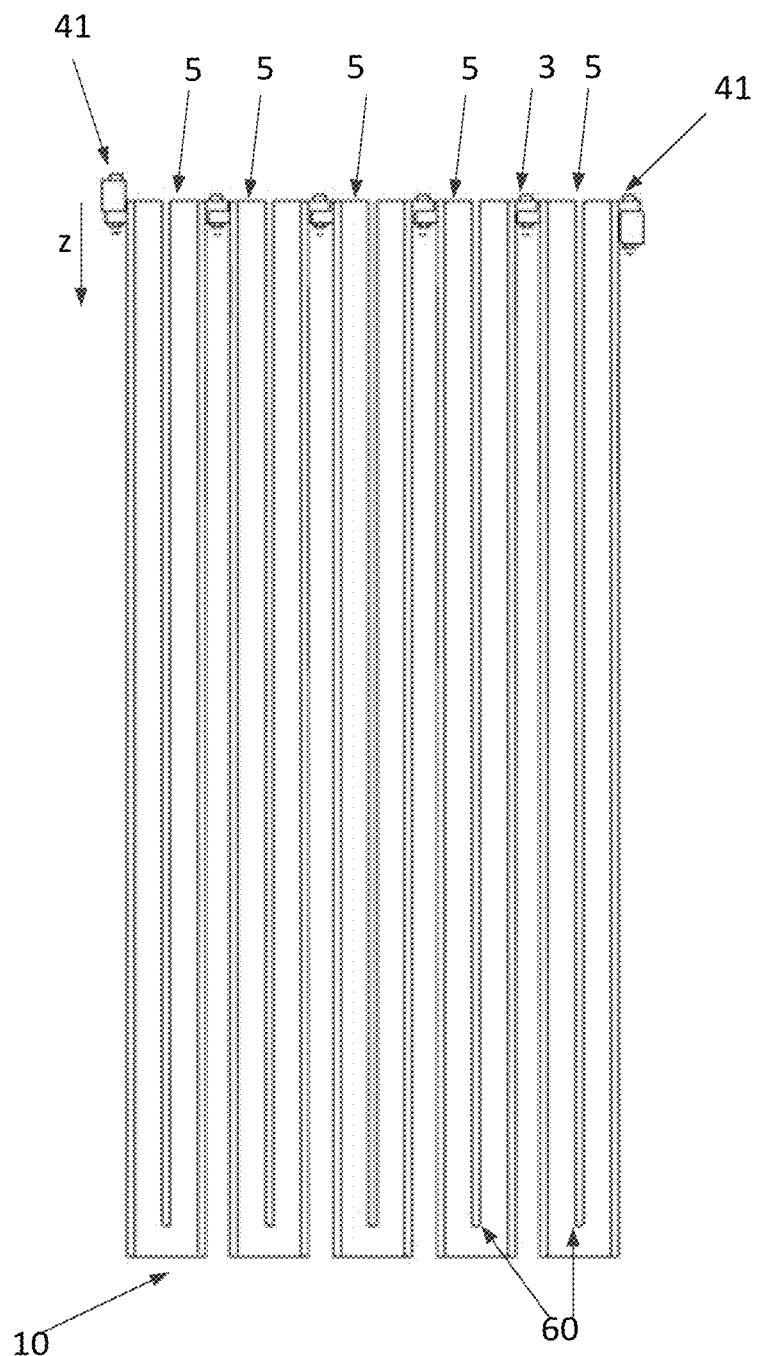

FIGS. 4 and 5 show an embodiment of a structured catalyst comprising an array of macroscopic structures as seen from above and from the side, respectively. FIG. 4 shows a structured catalyst 10 comprising an array of macroscopic structure 5 seen from above, viz. as seen from the arrow 11 in FIGS. 1a and 1b. The array has 6 rows, viz. 1a, 1b, 1c, 1d, 1e and 1f, of five macroscopic structures 5. The macroscopic structures 5 in each row are connected to its neighboring macroscopic structure (s) in the same row and the two outermost macroscopic structures in each row are connected to a conductor contact rail 41. The neighboring macroscopic structures 5 in a row of macroscopic structures are connected to each other by means of a connection piece 3.

FIG. 5 shows the structured catalyst 10 having an array of macroscopic structures 5 of FIG. 4 seen from the side. From FIG. 5, it can be seen that each macroscopic structure 5 extends longitudinally perpendicular to the cross section seen in FIG. 4. Each macroscopic structure 5 has a slit 60 cut into it along its longitudinal direction (see FIG. 5). Therefore, when energized by the power source, the current enters the array of macroscopic structures 5 via a conductor contact rail 41, is led through the first macroscopic structure 5 downwards until the lower limit of the slit 60 and is subsequently led upwards towards a connection piece 3. The current is led via a corresponding zigzag path, downwards and upwards, through each macroscopic structure 5 in each row 1a-1f of macroscopic structures 5 in the array 10. This configuration advantageously increases the resistance over the structured catalyst 10.

Figure 6:
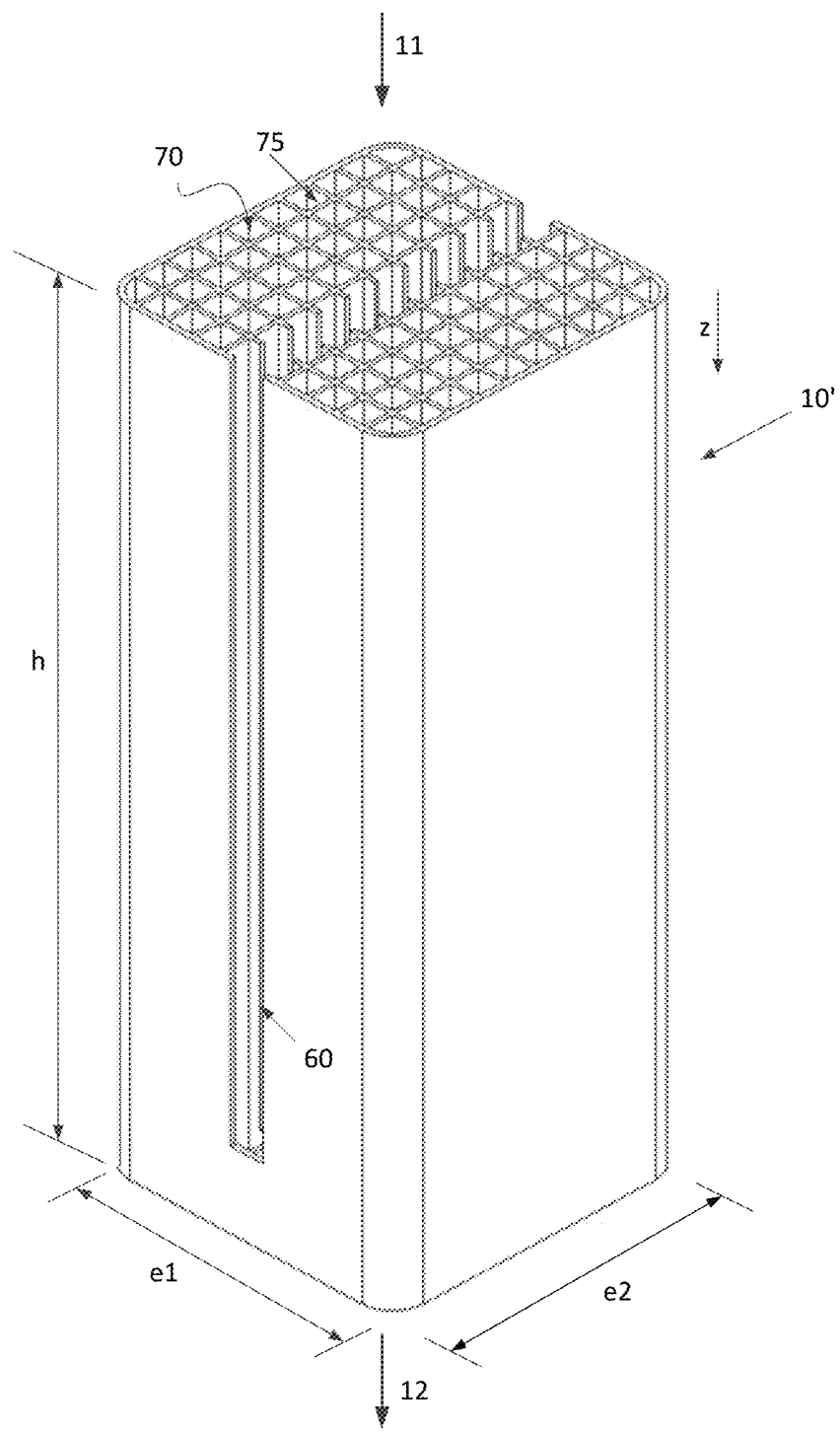
FIG. 6 shows an embodiment of the structured catalyst of the invention.

FIG. 6 shows a structured catalyst 10 according to the invention in a perspective view. The structured catalyst 10 comprises a macroscopic structure that is coated with a ceramic coating impregnated with catalytically active material. Within the structured catalyst are channels 70 extending along the longitudinal direction (shown by the arrow indicate 'h' in FIG. 6) of the macroscopic structure 5; the channels are defined by walls 75. In the embodiment shown in FIG. 6, the walls 75 define a number of parallel, square channels 70 when seen from the direction of flow as indicated by the arrow 12. The structured catalyst 10 has a substantially square perimeter when seen from above, defined by the edge lengths e1 and e2. However, the perimeter could also be circular or another shape.

The walls 75 of the structured catalyst 10 are of extruded or 3D printed material coated with a ceramic coating, e.g. an oxide, which has been coated onto the macroscopic structure. In the Figures, the ceramic coating is not shown. The ceramic coating is impregnated with catalytically active material. The ceramic coating and thus the catalytically active material are present on every wall within the structured catalyst 10 over which the gas flow flows during operation and interacts with the heated surface of the structured catalyst and the catalytically active material.

Thus, during use in a reactor system for the reverse water gas shift reaction, a feedstock flows through the channels 70 and interacts with the heated surface of the structured catalyst and with the catalytically active material supported by the ceramic coating.

In the structured catalyst 10 shown in FIG. 6 a slit 60 has been cut into the structured catalyst 10. This slit 60 forces a current to take a zigzag route, in this instance downwards and subsequently upwards, within the macroscopic structure thereby increasing the current path and thus the resistance and consequently the heat dissipated within the macroscopic structure. The slit 60 within the macroscopic structure may be provided with embedded insulating material in order to ensure that no current flows in the transverse direction of the slit 60.

The channels 70 in the structured catalyst 10 are open in both ends. In use of the structured catalyst in a reactor system, a feedstock flows through the unit, in the direction shown by arrows 11 and 12 in FIGS. 1a and 1b, and gets heated via contact with the walls 75 of the channels 70 and by heat radiation. The heat initiates the desired reverse water gas shift reaction. The walls 75 of the channels 70 may e.g. have a thickness of 0.5 mm, and the ceramic coating coated onto the walls 75 may e.g. have a thickness of 0.1 mm. Even though the arrows 11 and 12 (see FIGS. 1a and 1b) indicate that the flow of the feedstock is down-flow, the opposite flow direction, viz. an up-flow, is also conceivable.

Figure 7:
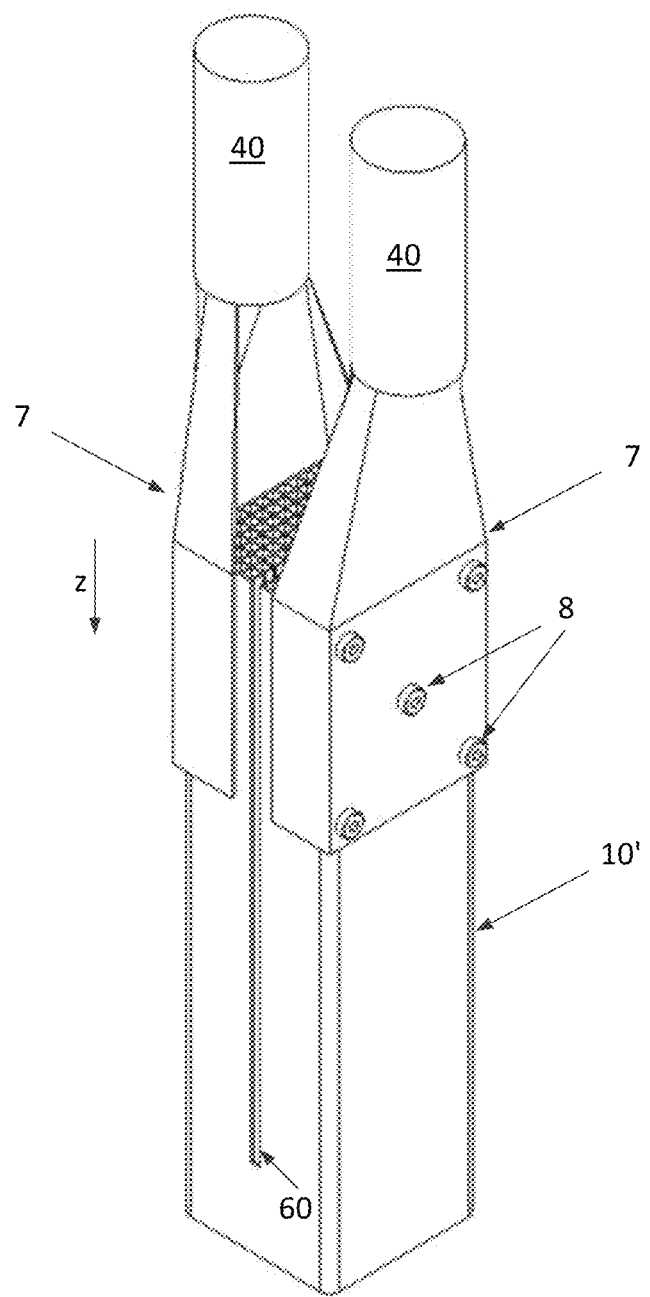
FIGS. 7 and 8 show embodiments of a structured catalyst with connectors.

FIG. 7 shows the structured catalyst 10 of FIGS. 1a and 1b in a perspective view and with connectors 7 attached. The connectors 7 each connect a part of the structured catalyst 10 to a conductor 40. The conductors 40 are both connected to a power supply (not shown). Each of the connectors 7 are connected to an upper part of the structured catalyst. When the conductors 40 are connected to a power supply, an electrical current is led to the corresponding connector 7 via the conductor and runs through the structured catalyst 10. The slit 60 hinders the current flow in a transverse direction (horizontal direction of FIG. 7) throughout its lengths along the height h of the structured catalyst 10. Therefore, the current runs in a direction downwards as seen in FIG. 7 in the part of the structured catalyst along the slit 60, subsequently it runs transversely to the longitudinal direction below the slit 60 as seen in FIG. 7 and finally the current runs upwards in the longitudinal direction of the structured catalyst to the other connector 7. The connectors 7 in FIG. 7 are mechanically fastened to the structured catalyst by means of inter alia mechanical fastening means such as screws and bolts. However, additional or alternative fastening means are conceivable. In an embodiment, the electrical power supply generates a voltage of 3V and a current of 400 A. The connectors 7 are e.g. made in materials like iron, aluminum, nickel, copper or alloys thereof.

As mentioned, the structured catalyst 10 is coated with a ceramic coating, such as an oxide, supporting the catalytically active material. However, the parts of the structured catalyst 10, which are connected to the connectors 7, should not be coated with an oxide. Instead, the macroscopic structure of the structured catalyst should be exposed or connected directly to the connectors 7 in order to obtain a good electrical connection between the macroscopic structure and the connector.

When the connectors 7 and thus the conductors 40 are connected to the same end of the structured catalyst 10, viz. the upper end as seen in FIG. 7, the feedstock entering into a reactor system housing the structured catalyst 10 would be able to cool the connectors 7 and the conductors 40. For instance, the feedstock entering into such a reactor system could have a temperature of 200° C. or 400° C. and would thus keep the connectors 7 and conductors 40 from reaching temperatures much higher than this temperature.

Figure 8:
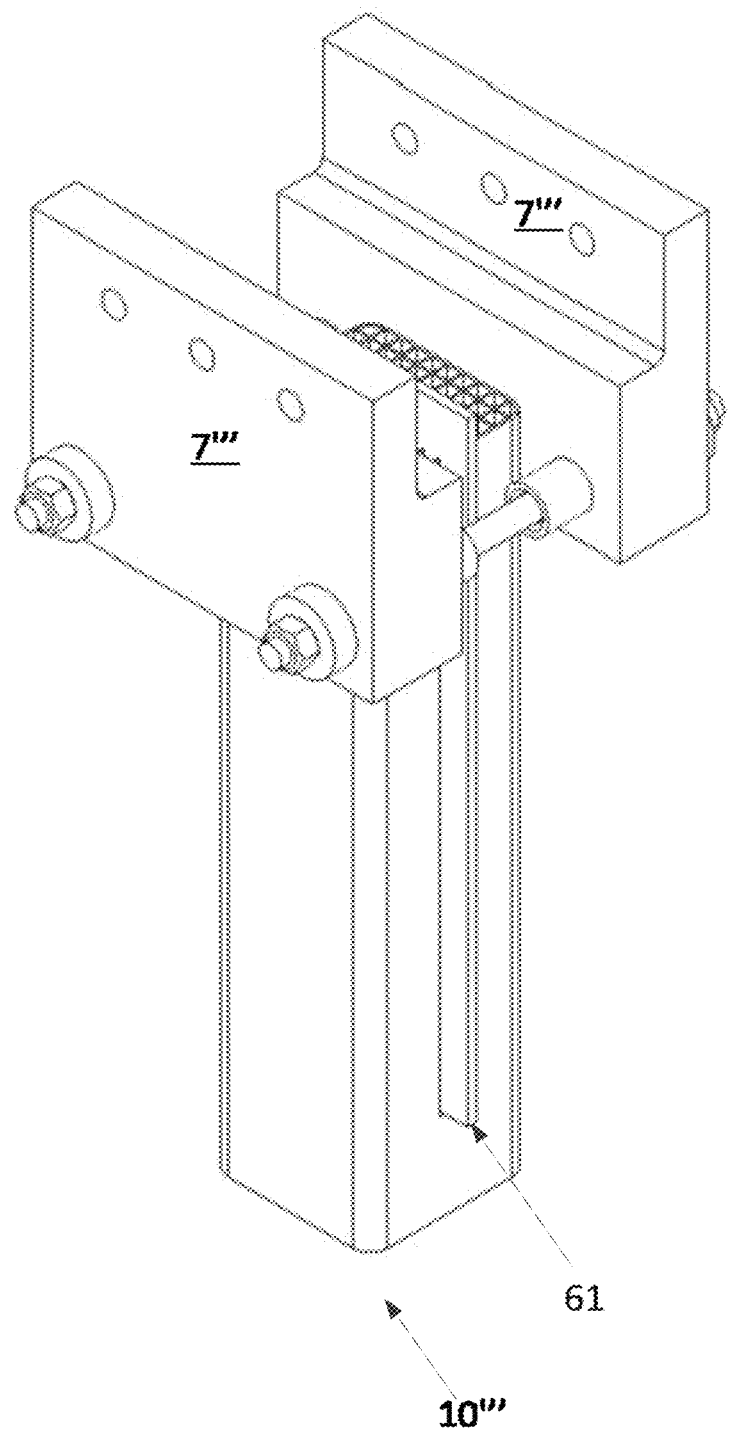

FIG. 8 shows another embodiment of a structured catalyst 10''' with connectors 7''. The structured catalyst 10''' is e.g. the structured catalyst as shown in FIG. 6. Each of the connectors 7''' has three holes at an upper side thereof for connection to conductors (not shown). A piece of electrically insulating material 61 is inside the slit 60 (see FIG. 6) of the structured catalyst 10''.

Figure 9:
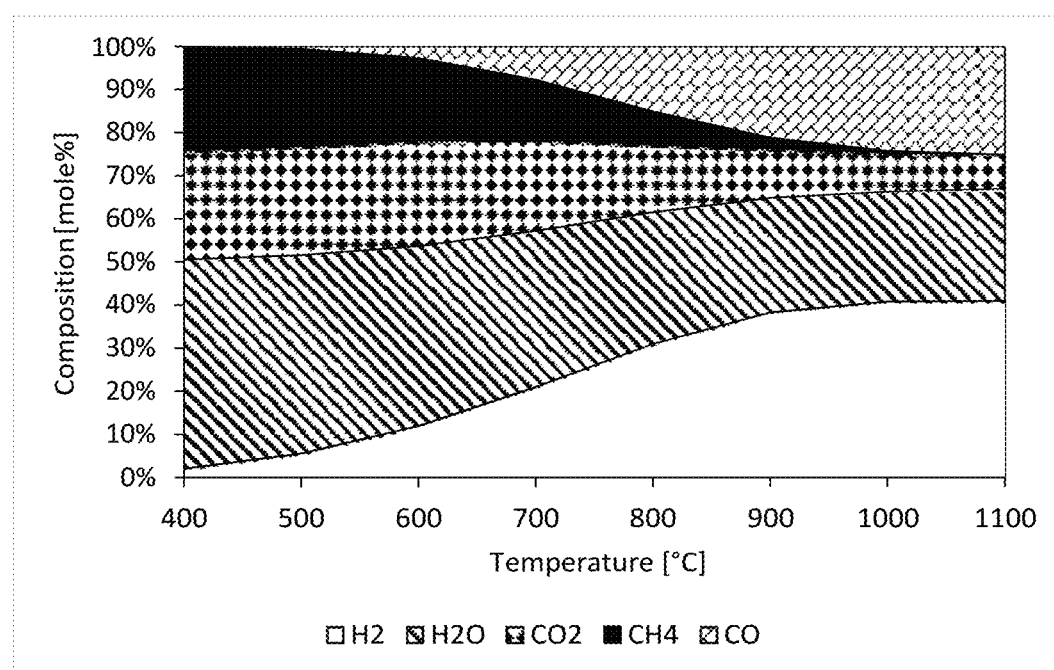
FIG. 9 shows the equilibrium composition according to the reverse water gas shift and methanation reactions of $CO_2$ and $H_2$ as a function of temperature at 29 barg when using a feedstock of 33.3% $CO_2$ and 66.67% $H_2$.

FIG. 9 shows the thermodynamic equilibrium of the methanation reaction and reverse water gas shift reaction as a function of temperature in a case using a mixture of 66.67% $H_2$ and 33.3% $CO_2$ as feedstock at a pressure of 29 barg. The figure illustrates that by increasing the outlet temperature of reactor system, the selectivity towards CO increases and the byproduct of $CH_4$ reduces. While operating at an outlet temperature of 500° C. produces a gas with a $H_2$/CO ratio of 9.0, this is decreased to 1.7 by increasing the temperature to 1000° C. Also, the methane concentration decreases from 22.7% at 500° C. to 0.6% at 1000° C. This adjustment of the reverse water gas shift reaction towards the CO side with the higher operating temperatures enables a selective production of a CO rich synthesis gas.

Figure 10:
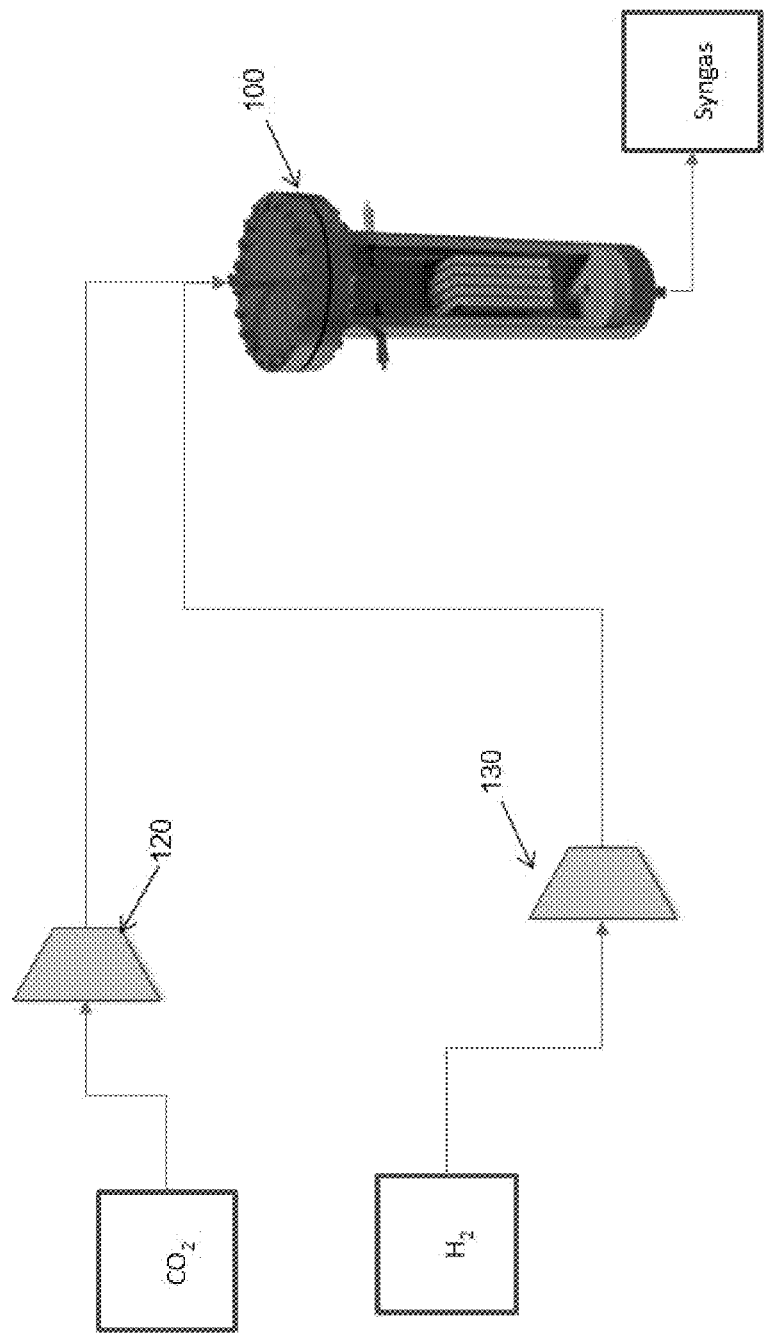
FIG. 10 shows an embodiment of the process including the reactor system and feedstock preparation.

FIG. 10 shows an embodiment of the process, where a feedstock is provided by mixing $H_2$ and pressurizing this by a compressor 130 to make a gas phase feedstock. In parallel, a feedstock of $CO_2$ is compressed in a compressor 120 and sent to the reactor system 100 together with the $H_2$ feedstock. In the reactor system 100, the temperature is increased while facilitating at least the reverse water gas shift reaction to provide a hot synthesis gas as first product gas. Alternatively, the compression of $CO_2$ and $H_2$ can be done in a combined compressor.

Figure 11:
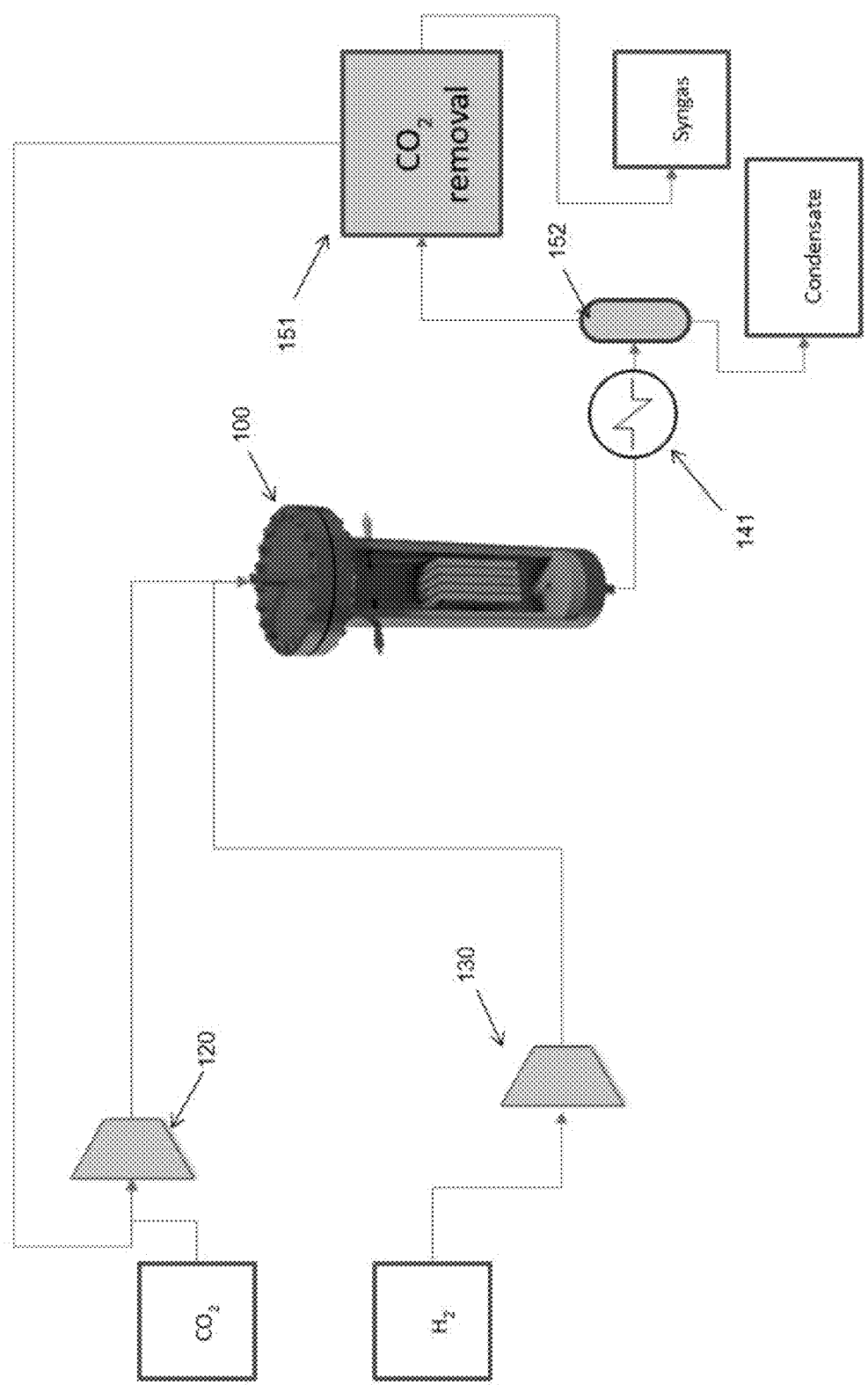
FIG. 11 shows an embodiment of the process including feedstock preparation, the reactor system, an upgrading unit comprising a flash separation and $CO_2$ removal, and recycling of an off-gas stream.

FIG. 11 shows an embodiment of the process similar to FIG. 11, including an upgrading unit comprising a flash separation unit 152 and a $CO_2$ removal unit 151. The first product gas from said reactor system 100 is cooled in a heat exchange unit 141 to below the dew point of the water in the stream. The liquid water is separated in the flash separation unit 152 to produce a condensate and a dry product gas. The dry product gas is sent to a $CO_2$ removal unit 151 where $CO_2$ is separated into an off-gas stream comprising substantially pure $CO_2$ stream and leaves an upgraded synthesis gas stream. The off-gas stream of substantially pure $CO_2$ is recycled back to the $CO_2$ compressor 120 and used as feedstock for said reactor system 100.

Figure 12:
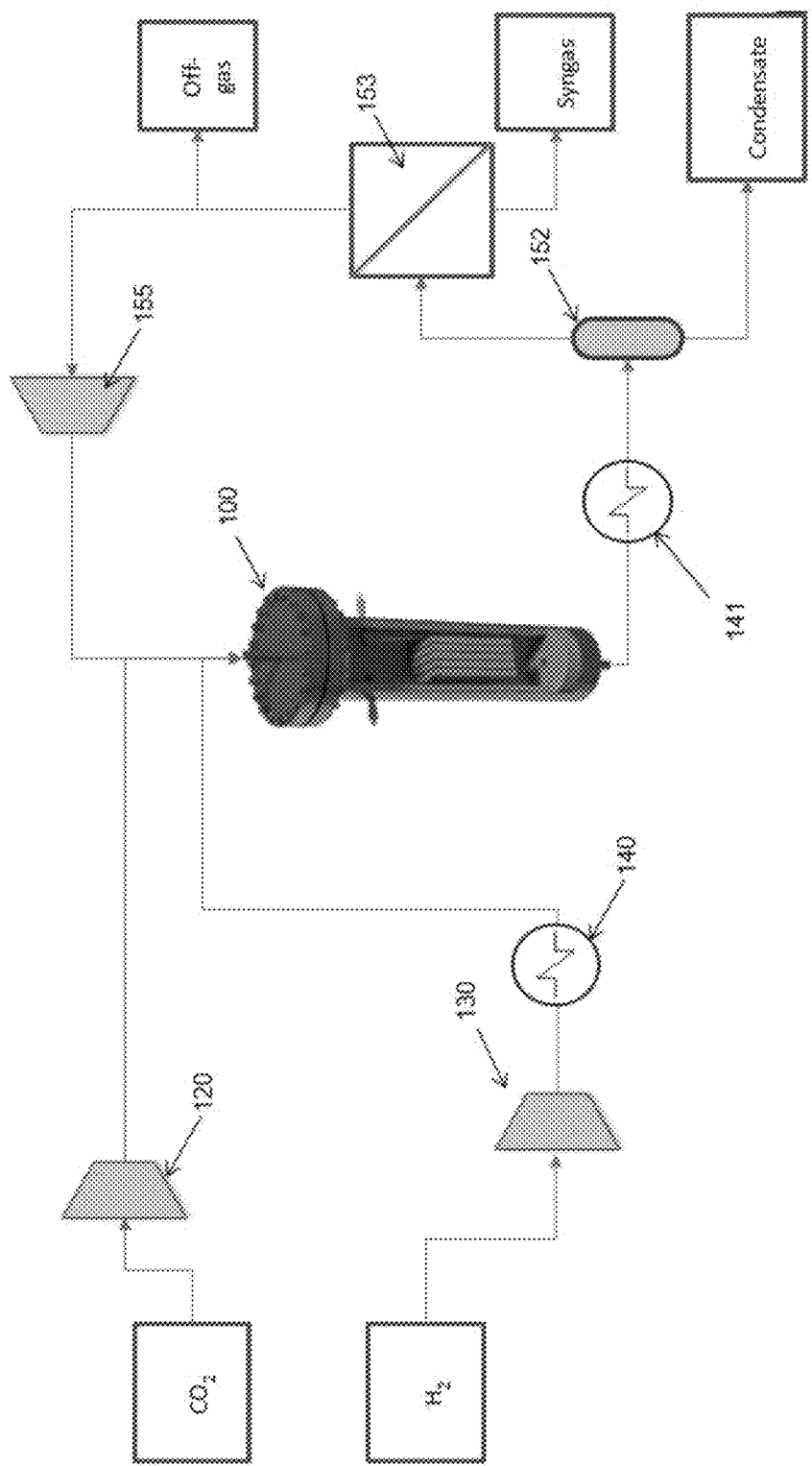
FIG. 12 shows an embodiment of the process including feedstock preparation, the reactor system, an upgrading unit comprising a flash separation and a membrane, and recycling of an off-gas stream.

FIG. 12 shows an embodiment of the process similar to FIG. 12, including an upgrading unit comprising a flash separation unit 152 and a membrane 153. The first product gas from said reactor system 100 is cooled in a heat exchange unit 141 to below the dew point of the water in the stream. The liquid water is separated in the flash separation unit 152 to produce a condensate and a dry product gas. The dry product gas is sent to a membrane unit 153 where principally $CO_2$ and $H_2$ permeate through the membrane to generate an off-gas stream and leaves a retentate of upgraded synthesis gas stream. The off-gas stream is partly recycled back to the reactor system by a use of a dedicated compressor 155.

Figure 13:
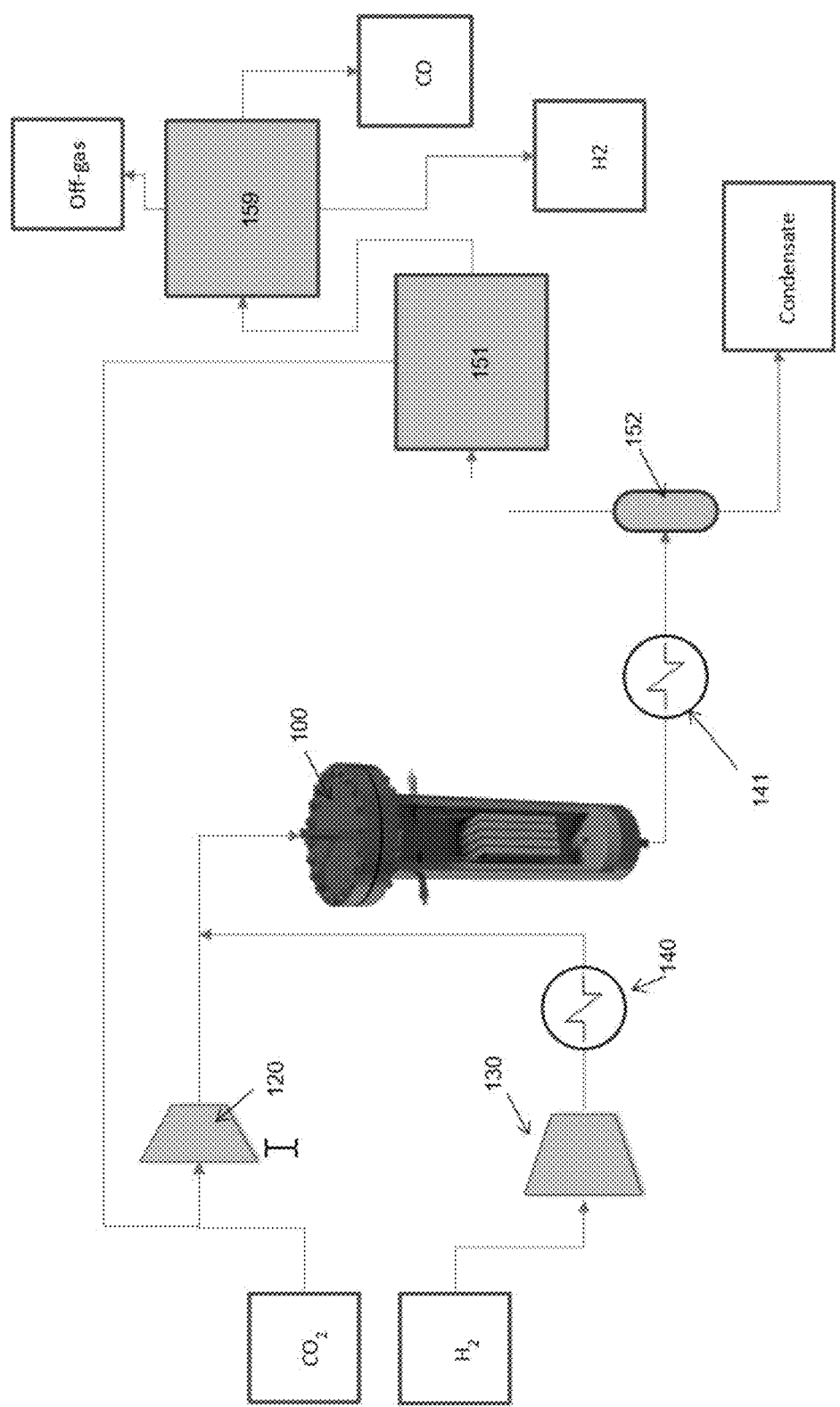
FIG. 13 shows an embodiment of the process including feedstock preparation, the reactor system, an upgrading unit comprising a flash separation, a $CO_2$ removal and a cold box, and recycling of an off-gas stream.

FIG. 13 shows an embodiment of the process similar to FIG. 13, including a cold box 159 unit. The stream from the $CO_2$ removal unit 151 is sent to a cold box unit 159, which produces an off-gas stream primarily consisting of $CH_4$ and $H_2$, and two upgraded synthesis gas streams, one rich in $H_2$ and the other rich in CO.

It should be noted, that even though the structured catalysts shown in the figures are shown as having channels with a square cross section, as seen perpendicular to the z axis, any appropriate shape of the cross sections of the channels is conceivable. Thus, the channels of the structured catalyst could alternatively be e.g. triangular, hexagonal, octagonal, or circular, where triangular, square, and hexagonal shapes are preferred.

While the invention has been illustrated by a description of various embodiments and examples while these embodiments and examples have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative methods, and illustrative examples shown and described.

Accordingly, departures may be made from such details without departing from the spirit or scope of applicant's general inventive concept.

EXAMPLES

Example 1

In an example of the invention, the method includes an initial reaction condition A where the feedstock consists of 59.7% $H_2$ and 40.3% $CO_2$ in a total flow of 1675 $Nm^3/h$ having a temperature of 260° C. at a pressure of 29.2 barg. Supplying a first electrical power of 32.6 kW generates an almost equilibrated gas composed of 32.8% $H_2O$, 17.6% $H_2$, 28.4% $CO_2$, 9.7% CO, and 11.6% $CH_4$ in a total flow of 1361 $Nm^3/h$ having a temperature of 700° C. at a pressure of 29.1 barg.

Switching to condition B over a period of about 70 min while applying a second electrical power of 804 kW generates an almost equilibrated gas composed of 27.7% $H_2O$, 31.9% $H_2$, 12.9% $CO_2$, 27.3% CO, and 0.2% $CH_4$ in a total flow of 1669 $Nm^3/h$ having a temperature of 1035° C. at a pressure of 29.1 barg.

Example 2

Figure 14:
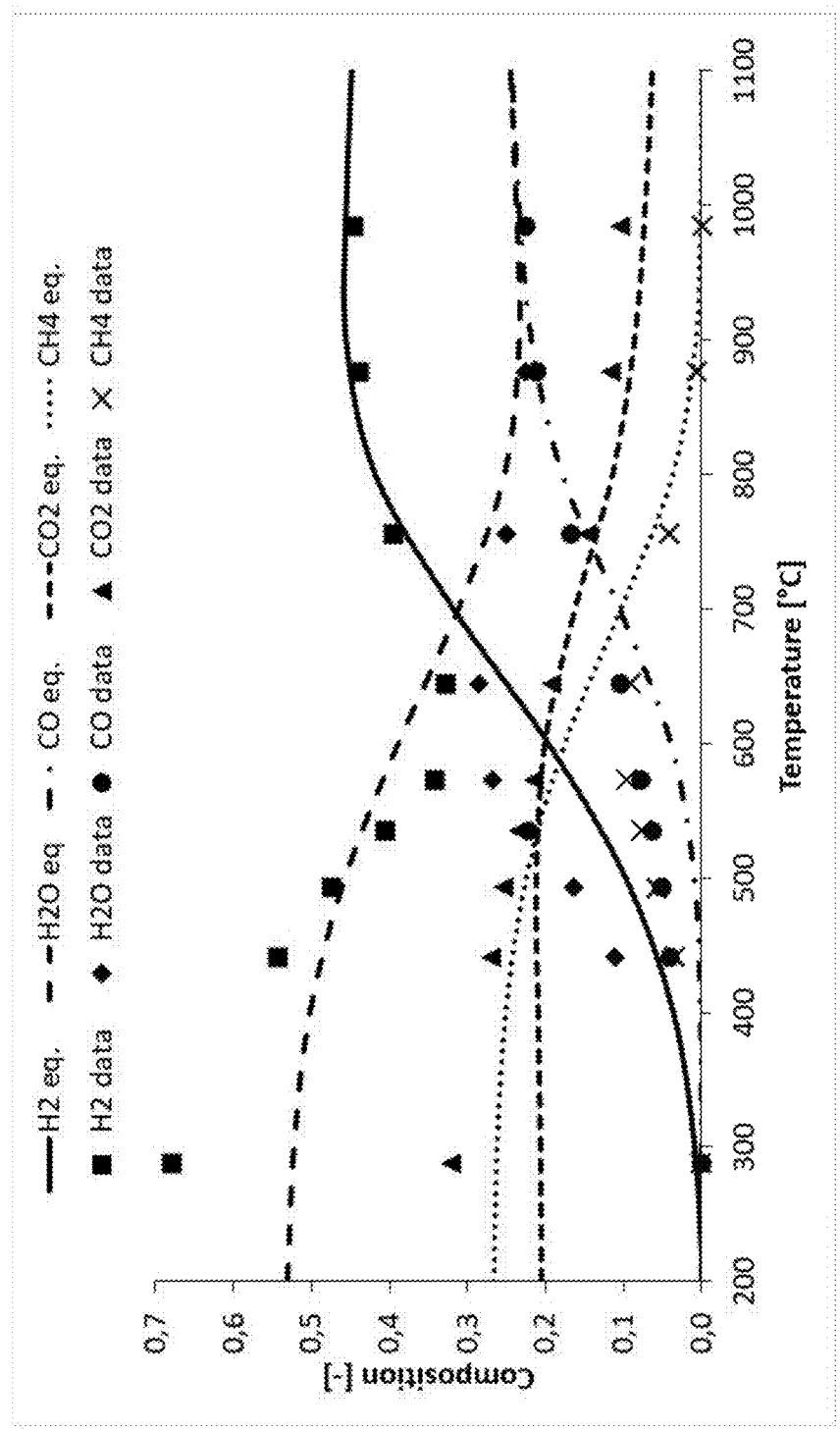
FIG. 14 shows experimental data from a test using an embodiment of the reactor system according to the invention.

FIG. 14 shows experimental data from a test using a reactor system according to the invention with a FeCrAl macroscopic structure, with $ZrO_2$ type ceramic coating, and Ni catalytically active material using a feedstock of $H_2$ and $CO_2$ in a ratio of 2.25 at 10 barg, while using a method according to the invention to increase the outlet temperature from the reactor system from between 400 and 1000° C. FIG. 14 shows a comparison between data points from the experiments and expected composition in the case where the reverse water gas shift and methanation reactions are in equilibrium. The $CO_2$ conversion increases with temperature producing CO and $H_2O$. The outlet mixtures is close to equilibrium at temperatures above 800° C. The Ni catalyst produces $CH_4$ due to methanation at temperatures below 650° C., but at higher temperatures the $CH_4$ is converted to CO and $H_2$ through the reverse methanation reaction resulting in very low $CH_4$ slip when reaching the high outlet temperatures.

Example 3

Figure 15:
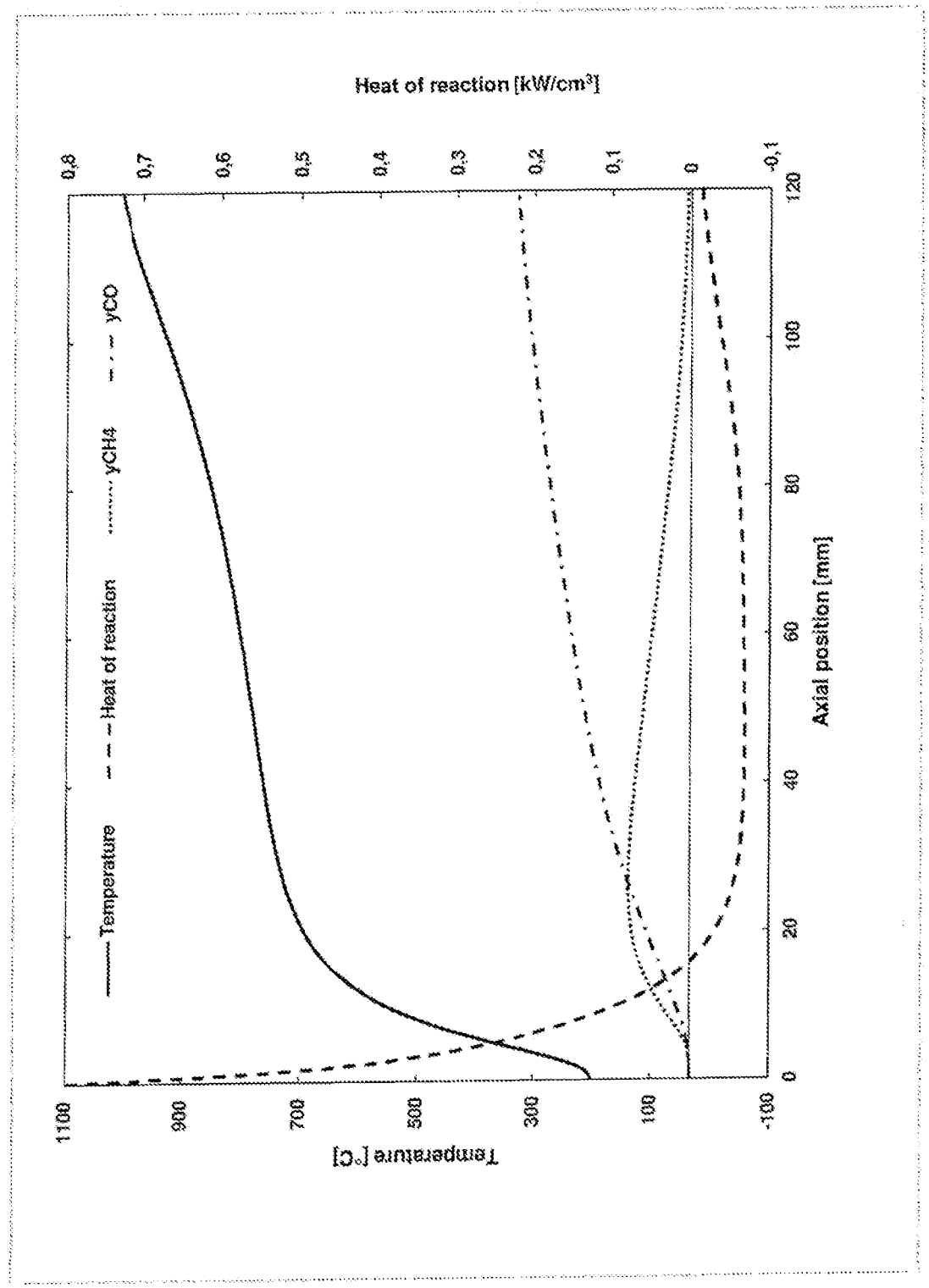
FIG. 15 shows simulation data simulating an embodiment of the reactor system according to the invention.

FIG. 15 shows reactor simulation data from a model using a reactor system according to the invention with a FeCrAl macroscopic structure, with $ZrO_2$ type ceramic coating, and Ni catalytically active material using a feedstock of 36 NL/h $H_2$ and $CO_2$ in a ratio of 2.25 at 10 barg and an inlet temperature of 200° C. where the temperature is increased in the reactor system by using a constant heat flux of 7.5 $kW/m^2$. The structured catalyst has a length of 12 cm and a cylindrical flow channel with a diameter of 5 mm. Simulations are based on Kinetics by Xu & Froment (1989), with Chapman-Emskogg approximation of physical constants. This figure shows the development in temperature, heat of reaction, and mole fractions of CO and $CH_4$ along the reaction length in the reactor. It is shown that the temperature increases continuously along the reaction length, but has an initial accelerating increase, which levels out in the reactor. This behaviour is explained by the reaction scheme being exothermic in the first part of the reactor up to 17 mm of the reaction length (i.e. 14% of the reaction length) as shown by the heat of reaction which has an initial increasingly positive value (exothermic), before switching to a negative value (endothermic) after the 14% progression in the reaction length. This behavior can be understood by an initial fast formation of methane by methanation in the first part of the reactive length. This methane is then converted to CO by reverse methanation in parallel to the reverse water gas shift reaction, ultimately giving a product gas with a high CO concentration.

Example 4

Figure 16A:
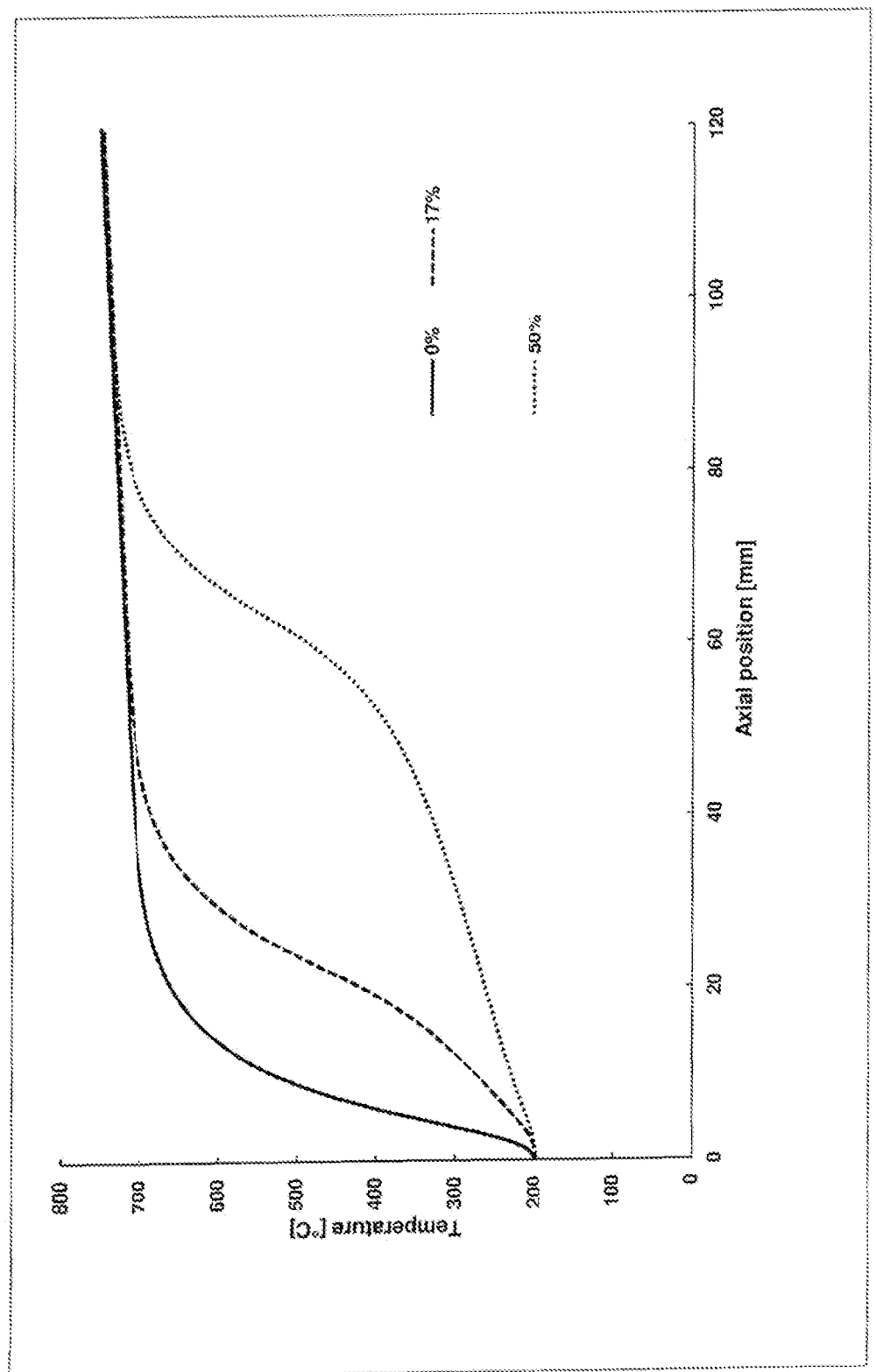
FIG. 16a shows simulation data simulating an embodiment of the reactor system according to the invention.
Figure 16B:
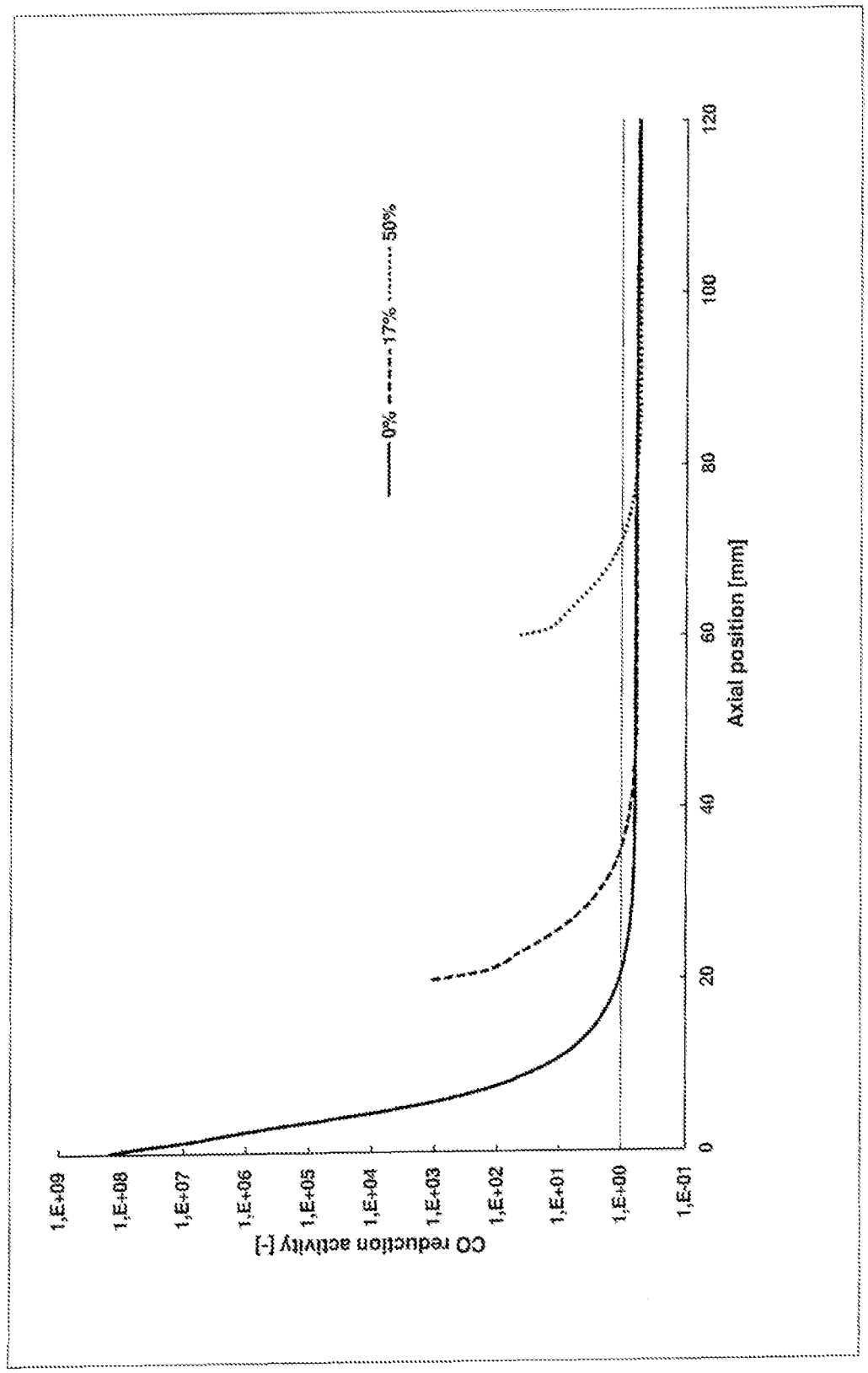
FIG. 16b shows simulation data simulating an embodiment of the reactor system according to the invention.

FIG. 16 shows 3 reactor simulation data from a model using a reactor system according to the invention with a FeCrAl macroscopic structure, with $ZrO_2$ type ceramic coating, and Ni catalytically active material using a feedstock of 36 NL/h $H_2$ and $CO_2$ in a ratio of 2.25 at 10 barg and an inlet temperature of 200° C. where the temperature is increased in the reactor system by using a constant heat flux of 2.5 $kW/m^2$. The structured catalyst has a length of 12 cm and a cylindrical flow channel with a diameter of 5 mm. Simulations are based on Kinetics by Xu & Froment (1989), with Chapman-Emskogg approximation of physical constants. The 3 simulations use different lengths of the ceramic coating having catalytically active material, i.e. the catalyzed hardware transitions from a ceramic coating of only $ZrO_2$ to a ceramic coating supporting Ni at 0%, 17% or 50% of the full length of the macroscopic structure. This represents 3 embodiments of the system, where FIG. 16*a* shows how the initial exothermic behavior of the reaction can be controlled. In parallel this configuration enables control on the activity for carbon formation of the CO reduction reaction, as illustrated by FIG. 16*b*, which shows that the maximum carbon potential can be decreased by changing the starting point of the catalyst material towards the higher temperature zone of the reactor. The carbon activity ($a_c$) is evaluated according to:

$$a_c = K_{eq}(CO\ red) * p(H2)/p(H2O)$$

Where $K_{eq}$(CO red) is the thermodynamic equilibrium constant of the CO reduction reaction, and p(i) is the partial pressure of i. Notice than when $a_c$<1 carbon formation cannot take place.

Example 5

Figure 17:
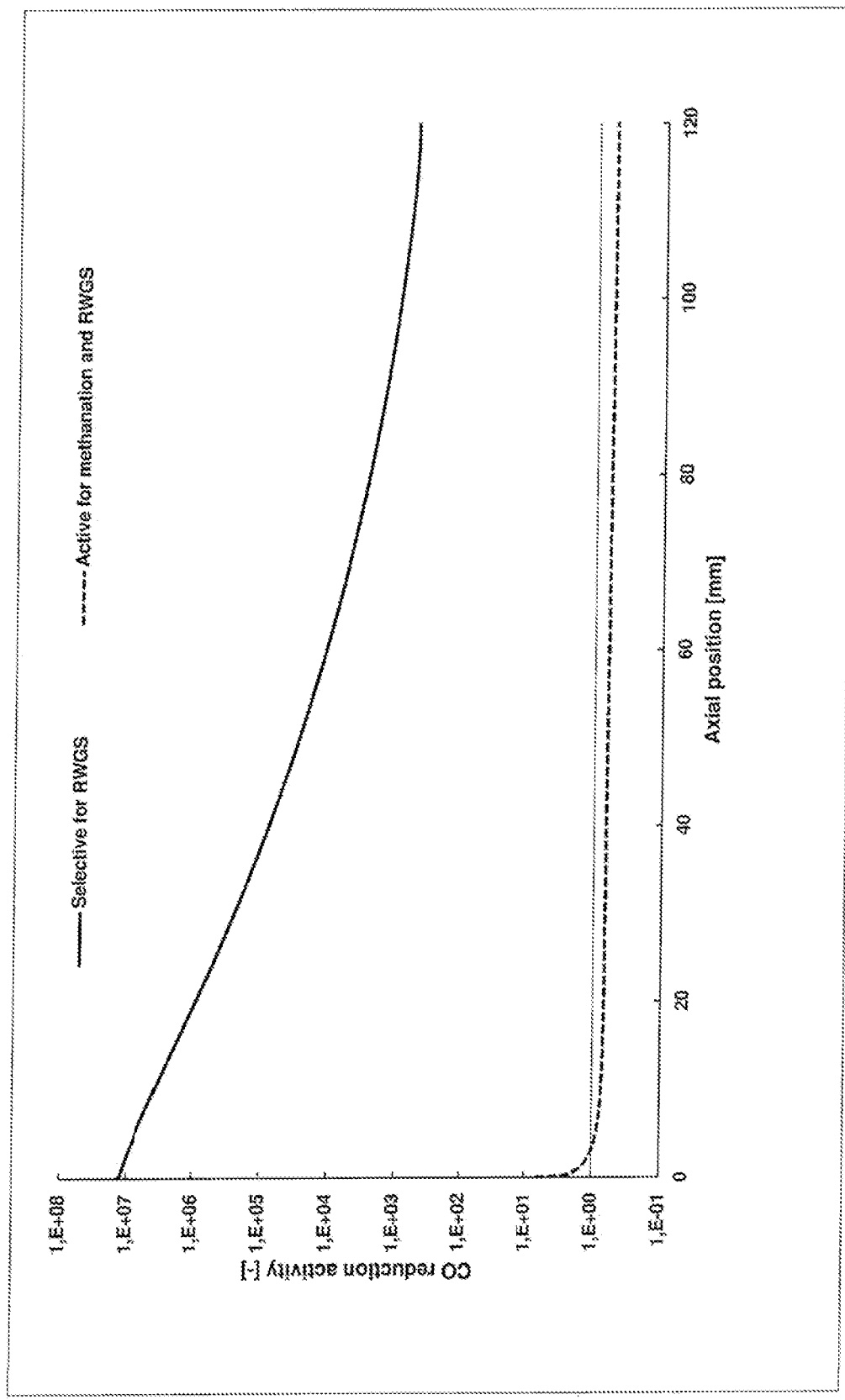
FIG. 17 shows simulation data simulating an embodiment of the reactor system according to the invention.

FIG. 17 shows a comparative reactor simulations data from a model using a reactor system according to the invention with a FeCrAl macroscopic structure, with $ZrO_2$ type ceramic coating, and Ni catalytically active material catalyzing both methanation and reverse water gas shift using a feedstock of 36 NL/h $H_2$ and $CO_2$ in a ratio of 2.25 at 10 barg and an inlet temperature of 200° C. where the temperature is increased in the reactor system (Labelled "Active for methanation and RWGS"), compared to a model using a reactor system with a FeCrAl macroscopic structure, with $ZrO_2$ type ceramic coating, and catalytically active material selective for only the reverse water gas shift reaction using a feedstock of $H_2$ and $CO_2$ in a ratio of 2.25 at 10 barg and an inlet temperature of 200° C. where the temperature is increased in the reactor system (Labelled "Selective for RWGS"). In both simulations a flux of 2.5 kW/m² was used. In both simulations, the structured catalyst has a length of 12 cm and a cylindrical flow channel with a diameter of 5 mm. Simulations are based on Kinetics by Xu & Froment (1989), with Chapman-Emskogg approximation of physical constants. FIG. 17 shows the carbon activity of the CO reduction reaction at the catalyst surface, which clearly shows how the critical zone where carbon formation has a thermodynamically driving potential is significantly reduced when having a non selective catalyst system catalyzing both methanation and reverse water gas shift as the CO reduction carbon activity in this case is much lower throughout the reaction zone.

Example 6

Figure 18:
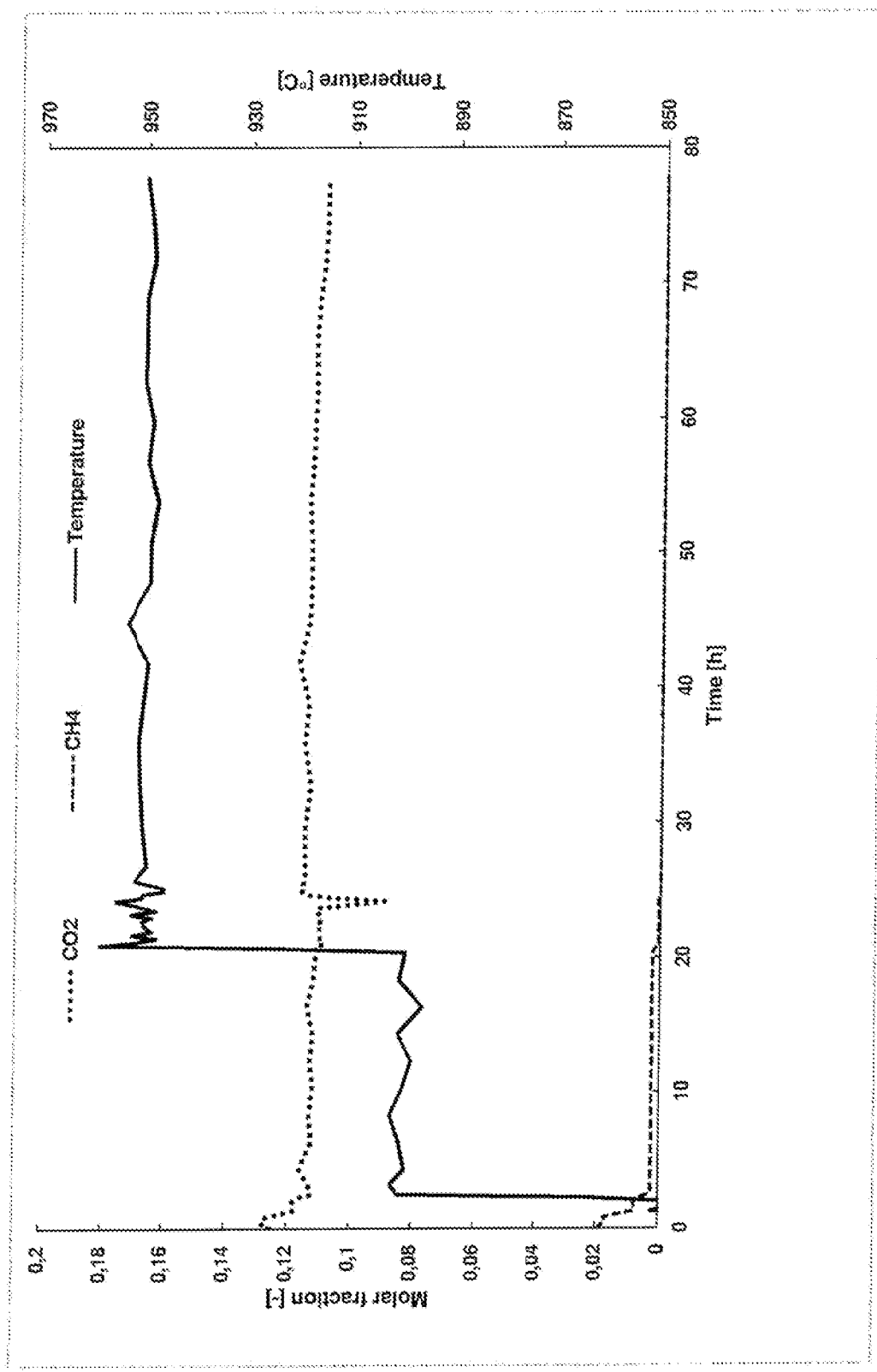
FIG. 18 shows experimental data from a test using an embodiment of the reactor system according to the invention

FIG. 18 shows experimental data from a test using a reactor system according to the invention with a FeCrAl macroscopic structure, with $ZrO_2$ type ceramic coating, and the downstream 50% of the reactor length with Ni catalytically active material using a feedstock of $H_2$ and $CO_2$ in a ratio of 2.25 at 10 barg, while using a method according to the invention to increase the outlet temperature from the reactor system to from between 400 and 1000° C. FIG. 18 shows outlet temperature and the $CO_2$ and methane molar fractions in the product gas analyzed by gas chromatography. FIG. 18 shows that increasing outlet temperature reduce the methane concentration in the product gas, and that operation is stable over 80 hours.

The following numbered items are provided:

Item 1. A reactor system for carrying out a reverse water gas shift reaction for production of a first product gas comprising CO from a feedstock comprising $CO_2$ and $H_2$, said reactor system comprising:
  a supply of feedstock comprising $CO_2$ and $H_2$;
  a structured catalyst comprising a macroscopic structure of an electrically conductive material and a catalytically active material capable of catalysing both the reverse water gas shift reaction and a methanation reaction;
  a structured catalyst arranged for being operated under such temperature and pressure that both the reverse water gas shift reaction and the methanation take place;
  a pressure shell housing said structured catalyst, said pressure shell comprising an inlet for letting in said feedstock and an outlet for letting out product gas, wherein said inlet is positioned so that said feedstock enters said structured catalyst in a first end of said structured catalyst and said product gas exits said structured catalyst from a second end of said structured catalyst;
  a heat insulation layer between said structured catalyst and said pressure shell;
  at least two conductors electrically connected to said structured catalyst and to an electrical power supply placed outside said pressure shell, wherein said electrical power supply is dimensioned to heat at least part of said structured catalyst to a temperature of at least 500° C. by passing an electrical current through said macroscopic structure, wherein said at least two conductors are connected to the structured catalyst at a position on the structured catalyst closer to said first end of said structured catalyst than to said second end of said structured catalyst, and wherein the structured catalyst is constructed to direct an electrical current to run from one conductor substantially to the second end of the structured catalyst and return to a second end of said at least two conductors;
  an outlet for a first product gas comprising CO.

Item 2. The reactor system according to item 1, wherein said macroscopic structure supports a ceramic coating.

Item 3. The reactor system according to item 2, wherein said ceramic coating at least partly supports a catalytically active material.

Item 4. The reactor system according to any of items 1-3, wherein the structured catalyst has a first reaction zone disposed closest to the first end of said structured catalyst, wherein the first reaction zone has an overall exothermic reaction, and a second reaction zone disposed closest to the second end of said structured catalyst, wherein the second reaction zone has an overall endothermic reaction.

Item 5. The reactor system according to item 4, wherein the first reaction zone has an extension of 5 to 60% of the length of the structured catalyst from its first to its second end.

Item 6. The reactor system of any of items 1-5, wherein the concentration of methane is higher in the partly catalyzed feedstock inside at least a part of the structured catalyst than in the feedstock and in the first product gas.

Item 7. The reactor system according to any of items 1-6, wherein the temperature of the structure catalyst is continuously increasing from the first end to the second end of the structured catalyst.

Item 8. The reactor system according to any of one the preceding items, wherein said electrical power supply is dimensioned to heat at least part of said structured catalyst to a temperature of at least 500° C., preferably at least 600° C., preferably at least 700° C., preferably at least 800° C., preferably at least 900° C., preferably at least 1000° C., and most preferably at least 1100° C.

Item 9. The reactor system according to any one of the preceding items, wherein the feedstock additionally comprises $N_2$, CO, $CH_4$, higher hydrocarbons and/or Ar.

Item 10. The reactor system according to any one of the preceding items, wherein the pressure shell has a design pressure of between 2 and 30 bar, preferably between 4 and 25 bar, more preferably between 6 and 20 bar, more preferably between 7 and 15 bar, and most preferably between 8 and 12 bar.

Item 11. The reactor system according to any one of items 1-6, wherein the pressure shell has a design pressure of between 30 and 200 bar.

Item 12. The reactor system according to any one of the preceding items, wherein the resistivity of the electrically conductive material is between $10^{-5}$ Ω·m and $10^{-7}$ Ω·m.

Item 13. The reactor system according to any one of the preceding items, where said at least two conductors are led through the pressure shell in a fitting so that the at least two conductors are electrically insulated from the pressure shell.

Item 14. The reactor system according to item 13, wherein said pressure shell further comprises one or more inlets close to or in combination with at least one fitting in order to allow a cooling gas to flow over, around, close to, or inside at least one conductor within said pressure shell.

Item 15. The reactor system according to any one of the preceding items, wherein the reactor system further comprises an inner tube in heat exchange relationship with but electrically insulated from the structured catalyst, said inner tube being adapted to withdraw a product gas from the structured catalyst so that the product gas flowing through the inner tube is in heat exchange relationship with gas flowing over the structured catalyst.

Item 16. The reactor system according to any one of the preceding items, wherein the connection between the structured catalyst and said at least two conductors is a mechanical connection, a welded connection, a brazed connection or a combination thereof.

Item 17. The reactor system according to any one of the preceding items, wherein the electrically conductive material comprises a 3D printed or extruded and sintered macroscopic structure, said macroscopic structure is supporting a ceramic coating, wherein said ceramic coating supports a catalytically active material.

Item 18. The reactor system according to any one of the preceding items, wherein the structured catalyst comprises an array of macroscopic structures electrically connected to each other.

Item 19. The reactor system according to any of the preceding items, wherein said structured catalyst has electrically insulating parts arranged to increase the length of a principal current path between said at least two conductors to a length larger than the largest dimension of the structured catalyst.

Item 20. The reactor system according to any of the preceding items, wherein said structured catalyst has at least one electrically insulating part arranged to direct a current through said structured catalyst in order to ensure that for at least 70% of the length of said structured catalyst, a current density vector of the principal current path has a non-zero component value parallel to the length of said structured catalyst.

Item 21. The reactor system according to any one of the preceding items, wherein said macroscopic structure has a plurality of parallel channels, a plurality of non-parallel channels and/or a plurality of labyrinthic channels.

Item 22. The reactor system according to any one of the preceding items, wherein the reactor system further comprises a bed of a second catalyst material upstream said structured catalyst within said pressure shell.

Item 23. The reactor system according to any one of the preceding items, wherein said reactor system further comprises a third catalyst material in the form of catalyst pellets, extrudates or granulates loaded into the channels of said macroscopic structure.

Item 24. The reactor system according to any one of the preceding items, wherein the reactor system further comprises a bed of a fourth catalyst material downstream said structured catalyst within said pressure shell.

Item 25. The reactor system according to any one of the preceding items, wherein the material of the macroscopic structure is chosen as a material arranged to generate a heat flux of 500 to 100.000 W/m² by resistance heating of the material.

Item 26. The reactor system according to any one of the preceding items, wherein the structured catalyst comprises a first part arranged to generate a first heat flux and a second part arranged to generate a second heat flux, where the first heat flux is lower than the second heat flux, and where the first part is upstream the second part.

Item 27. The reactor system according to any one of the preceding items, wherein the structured catalyst comprises a third part arranged to generate a third heat flux, where the third heat flux is lower than the first and/or the second heat flux, and where the third part is downstream the first and/or second part.

Item 28. The reactor system according to any one of the preceding items, wherein said reactor system further comprises a control system arranged to control the electrical power supply to ensure that the temperature of the gas exiting the pressure shell lies in a predetermined range and/or to ensure that the conversion of the feedstock lies in a predetermined range.

Item 29. The reactor system according to any one of the preceding items, wherein the structured catalyst within said reactor system has a ratio between the area equivalent diameter of a horizontal cross section through the structured catalyst and the height of the structured catalyst in the range from 0.1 to 2.0.

Item 30. The reactor system according to any one of the preceding items, wherein the height of the reactor system is between 0.5 and 7 m, more preferably between 0.5 and 3 m.

Item 31. The reactor system according to any one of the preceding items, wherein the length of the gas passage through the structured catalyst is less than the length of the passage of current from one electrode through the structured catalyst and to the next electrode.

Item 32. The reactor system according to any of items 4-31, arranged such that the exit temperature of the product stream from the second reaction zone of the reactor system is between 500-1300° C., such as between 800-1100° C., preferably between 850-1050° C.

Item 33. A process for converting a feedstock comprising $CO_2$ and $H_2$ to a first product gas comprising CO in a reactor system comprising a pressure shell housing a structured catalyst comprising a macroscopic structure of electrically conductive material and a catalytically active material; wherein said reactor system is provided with heat insulation between said structured catalyst and said pressure shell; said process comprising the steps of:

providing a pressurized feedstock, supplying said pressurized feedstock to said pressure shell through an inlet positioned so that said feedstock enters said structured catalyst in a first end of said structured catalyst;

using a catalytically active material capable of catalysing both the reverse water gas shift reaction and a methanation reaction;

allowing the feedstock to undergo a reverse water gas shift reaction over the structured catalyst under such temperature and pressure that both the reverse gas shift reaction and the methanation reaction take place;

outletting a product gas from said pressure shell, wherein said product gas exits said structured catalyst from a second end of said structured catalyst;

supplying electrical power via electrical conductors connecting an electrical power supply placed outside said pressure shell to said structured catalyst, allowing an electrical current to run through said macroscopic structure, thereby heating at least part of the structured catalyst to a temperature of at least 500° C., wherein said at least two conductors are connected to the structured catalyst at a position on the structured catalyst closer to said first end of said structured catalyst than to said second end of said structured catalyst, and wherein the structured catalyst is constructed to direct an electrical current to run from one conductor substantially to the second end of the structured catalyst and return to a second of said at least two conductors, thereby heating at least part of the structured catalyst to a temperature sufficient for said feedstock to undergo the reverse water gas shift reaction over the structured catalyst, outletting a first product gas comprising CO from the reactor system.

Item 34. The process according to item 33, wherein said macroscopic structure supports a ceramic coating.

Item 35. The process according to item 34, wherein said ceramic coating supports a catalytically active material.

Item 36. The process according to any of items 33-35, wherein the structured catalyst has a first reaction zone disposed closest to the first end of said structured catalyst, wherein the first reaction zone has an overall exothermic reaction, and a second reaction zone disposed closest to the second end of said structured catalyst, wherein the second reaction zone has an overall endothermic reaction.

Item 37. The process according to any of items 36, wherein the first reaction zone has an extension of 5 to 60% of the length of the structured catalyst from its first to its second end.

Item 38. The process according to any of items 33-37, wherein the concentration of methane is higher in the partly catalyzed feedstock inside at least a part of the structured catalyst than in the feedstock and in the first product gas.

Item 39. The process according to any of items 33-38, wherein the temperature is continuously increasing from the first end to the second end of the structured catalyst.

Item 40. The process according to any one of items 33-39, wherein said feedstock is pressurised to a pressure between 2 and 30 bar, preferably between 4 and 25 bar, more preferably between 6 and 20 bar, more preferably between 7 and 15 bar, and most preferably between 8 and 12 bar.

Item 41. The process according to any one of items 33-40 wherein said feedstock is pressurised to a pressure between 30 and 200 bar.

Item 42. The process according to any one of items 33-41, wherein the feedstock additionally comprises $N_2$, CO, $CH_4$, higher hydrocarbons and/or Ar.

Item 43. The process according to any one of claims 33-42, wherein at least part of the structured catalyst is heated to a temperature of at least 500° C., preferably at least 600° C., preferably at least 700° C., preferably at least 800° C., preferably at least 900° C., preferably at least 1000° C., and most preferably at least 1100° C.

Item 44. The process according to any one of items 33-43, further comprising the step of inletting a cooling gas through an inlet through the pressure shell in order to allow said cooling gas to flow over at least one conductor.

Item 45. The process according to any one of items 33-44, wherein the process further comprises the step of feeding the first product gas comprising synthesis gas to an upgrading unit and separating it into an upgraded synthesis gas stream and one or more off-gas stream.

Item 46. The process according to any one of items 33-45, wherein the process further comprises the step of recycling one or more of the off-gas streams to upstream units of said upgrading unit.

Item 47. A method for rapidly switching a reverse water gas shift reaction of a feedstock comprising $CO_2$ in a reactor system according to any one of items 1-29, from a first steady-state reaction condition (A) to a second steady-state reaction condition (B) or vice-versa; said method comprising the steps of:

in said first steady-state reaction condition (A):
supplying said feedstock to the reactor system in a first total flow, and
supplying a first electrical power via electrical conductors connecting an electrical power supply placed outside said pressure shell to said structured catalyst, thereby allowing a first electrical current to run through said electrically conductive material,
thereby heating at least part of the structured catalyst to a first temperature at which said feedstock is converted to a first product gas over said structured catalyst under said first steady-state reaction conditions (A); and said first product gas is outlet from the reactor system;

and, in said second steady-state reaction condition (B):
supplying said feedstock to the reactor system in a second total flow,
supplying a second electrical power via electrical conductors connecting an electrical power supply placed outside said pressure shell to said structured catalyst, thereby allowing a second electrical current to run through said electrically conductive material,
thereby heating at least part of the structured catalyst to a second temperature; at which said feedstock is converted to a second product gas over said structured catalyst under said second steady-state reaction conditions (B); and said second product gas is outlet from the reactor system;

wherein said second electrical power is higher than said first electrical power; and/or said second total flow is higher than said first total flow.

Item 48. The method according to item 47, wherein said at least two conductors are connected to the structured catalyst at a position on the structured catalyst closer to said first end of said structured catalyst than to said second end of said structured catalyst, and wherein the structured catalyst is constructed to direct an electrical current to run from one conductor substantially to the second end of the structured catalyst and return to a second of said at least two conductors.

Item 49. The method according to any one of items 47-48, wherein the ratio of total gas feed flow in said first reaction condition A to said second reaction condition B (A:B) is at least 1:10.

Item 50. The method according to any one of items 47-49, wherein the product gas outlet temperature from the structured catalyst in reaction condition B is between 50° C. to 600° C. higher, such as between 100° C. to 500° C. higher, preferably between 150° C. to 400° C. higher than the product gas outlet temperature from the structured catalyst in reaction condition A.

Item 51. The method according to any one of items 47-50, wherein the switch between reaction condition A and B includes a gradual change of the total gas feed flow from said first total flow to said second total flow and simultaneous gradual change of the applied electrical potential over said electrically conductive material from said first to said second electrical power.

Item 52. The method according to any one of items 47-51, wherein the product gas outlet temperature from the structured catalyst in reaction condition B is no more than 50° C. higher than the product gas outlet temperature from the structured catalyst in reaction condition A.

Item 53. The method according to any one of items 47-52, wherein a proportional-integral-derivative (PID) controller controls the electrical potential based on feedback reading of the process value of product gas outlet temperature from the structured catalyst.

Item 54. The method according to any one of claims 47-53, wherein the product gas outlet temperature from the structured catalyst is measured directly beneath or on the most downstream surface of the structured catalyst.

Item 55. The method according to any one of items 47-54, wherein the switch between reaction condition A and B takes place over a period of less than 3 hours, such as less than 2 hours, such as less than 60 min, preferably less than 30 min, and even more preferably less than 15 min.

Item 56. The method according to any one of items 47-55, wherein the switch between reaction condition A and B involves supplying a second electrical power to the structured catalyst.

Item 57. The method according to any one of items 47-56, wherein the switch between reaction condition A and B comprises a transition state between said reaction conditions A and B; said transition state comprising a first period in which the electrical power is switched off, followed by a second period in which said second electrical power of condition B is supplied to the structured catalyst.

Item 58. The method according to any one of items 47-57, wherein the switch between reaction condition A and B comprises a transition state between said reaction conditions A and B; said transition state comprising a first period in which a third electrical power is supplied to the structured catalyst, followed by a second period in which said second electrical power of condition B is supplied to the structured catalyst, said third electrical power being higher than the second electrical power.

The invention claimed is:

1. A reactor system for carrying out a reverse water gas shift reaction for production of a first product gas comprising CO from a feedstock comprising $CO_2$ and $H_2$, said reactor system comprising:
a supply of feedstock comprising $CO_2$ and $H_2$;
a structured catalyst comprising a macroscopic structure of an electrically conductive material and a catalytically active material capable of catalysing both the reverse water gas shift reaction and a methanation reaction;
the structured catalyst arranged for being operated under such temperature and pressure that both the reverse water gas reaction and the methanation reaction take place;
a pressure shell housing said structured catalyst, said pressure shell comprising an inlet for letting in said feedstock and an outlet for letting out product gas, wherein said inlet is positioned so that said feedstock enters said structured catalyst in a first end of said structured catalyst and said product gas exits said structured catalyst from a second end of said structured catalyst;
a heat insulation layer between said structured catalyst and said pressure shell;
at least two conductors electrically connected to said structured catalyst and to an electrical power supply placed outside said pressure shell, wherein said electrical power supply is dimensioned to heat at least part of said structured catalyst to a temperature of at least 500° C. by passing an electrical current through said macroscopic structure, wherein said at least two conductors are connected to the structured catalyst at a position on the structured catalyst closer to said first end of said structured catalyst than to said second end of said structured catalyst, and wherein the structured catalyst is constructed to direct an electrical current to run from one conductor substantially to the second end of the structured catalyst and return to a second end of said at least two conductors;
an outlet for a first product gas comprising CO.

2. The reactor system according to claim 1, wherein said macroscopic structure supports a ceramic coating.

3. The reactor system according to claim 2, wherein said ceramic coating at least partly supports a catalytically active material.

4. The reactor system according to claim 2, wherein the ceramic coating supports a catalytically active material in the most downstream part of the structured catalyst.

5. The reactor system according to claim 4, wherein the most downstream part of the structured catalyst ranges from 10% to 100% of an extension along a length of the structured catalyst from the first end to the second end.

6. The reactor system according to claim 1, wherein the structured catalyst has a first reaction zone disposed closest to the first end of said structured catalyst, wherein the first reaction zone has an overall exothermic reaction, and a second reaction zone disposed closest to the second end of said structured catalyst, wherein the second reaction zone has an overall endothermic reaction.

7. The reactor system according to claim 6, wherein the first reaction zone has an extension of from 5% to 60% of the length of the structured catalyst from its first to its second end.

8. The reactor system of claim 1, wherein the concentration of methane is higher in the partly catalyzed feedstock inside at least a part of the structured catalyst than in the feedstock and in the first product gas.

9. The reactor system according to claim 1, wherein temperature of the structured catalyst is continuously increasing from the first end to the second end of the structured catalyst.

10. The reactor system according to claim 1, wherein said electrical power supply is dimensioned to heat at least part of said structured catalyst to a temperature of at least 600° C.

11. A method for rapidly switching a reverse water gas shift reaction of a feedstock comprising $CO_2$ in a reactor system according to claim 1, from a first steady-state reaction condition (A) to a second steady-state reaction condition (B) or vice-versa; said method comprising the steps of:
in said first steady-state reaction condition (A):
supplying said feedstock to the reactor system in a first total flow, and
supplying a first electrical power via electrical conductors connecting an electrical power supply placed outside said pressure shell to said structured catalyst, thereby allowing a first electrical current to run through said electrically conductive material,
thereby heating at least part of the structured catalyst to a first temperature at which said feedstock is converted to a first product gas over said structured catalyst under said first steady-state reaction conditions (A); and said first product gas is outlet from the reactor system;
and, in said second steady-state reaction condition (B):
supplying said feedstock to the reactor system in a second total flow,
supplying a second electrical power via electrical conductors connecting an electrical power supply placed outside said pressure shell to said structured catalyst, thereby allowing a second electrical current to run through said electrically conductive material,
thereby heating at least part of the structured catalyst to a second temperature; at which said feedstock is converted to a second product gas over said structured catalyst under said second steady-state reaction conditions (B); and said second product gas is outlet from the reactor system;
wherein said second electrical power is higher than said first electrical power; and/or said second total flow is higher than said first total flow.

12. The method according to claim 11, wherein the ratio of total gas feed flow in said first reaction condition A to said second reaction condition B (A:B) is at least 1:10.

13. A process for converting a feedstock comprising $CO_2$ and $H_2$ to a first product gas comprising CO in a reactor system comprising a pressure shell housing a structured catalyst comprising a macroscopic structure of electrically conductive material and a catalytically active material; wherein said reactor system is provided with heat insulation between said structured catalyst and said pressure shell; said process comprising the steps of:
providing a pressurized feedstock;
supplying said pressurized feedstock to said pressure shell through an inlet positioned so that said feedstock enters said structured catalyst in a first end of said structured catalyst;
using a catalytically active material capable of catalysing both the reverse water gas shift reaction and a methanation reaction;
allowing the feedstock to undergo a reverse water gas shift reaction over the structured catalyst under such temperature and pressure that both the reverse gas shift reaction and the methanation reaction take place;
outletting a product gas from said pressure shell, wherein said product gas exits said structured catalyst from a second end of said structured catalyst;
supplying electrical power via electrical conductors connecting an electrical power supply placed outside said pressure shell to said structured catalyst, allowing an electrical current to run through said macroscopic structure, thereby heating at least part of the structured catalyst to a temperature of at least 500° C., wherein said at least two conductors are connected to the structured catalyst at a position on the structured catalyst closer to said first end of said structured catalyst than to said second end of said structured catalyst, and wherein the structured catalyst is constructed to direct an electrical current to run from one conductor substantially to the second end of the structured catalyst and return to a second of said at least two conductors, thereby heating at least part of the structured catalyst to a temperature sufficient for said feedstock to undergo the reverse water gas shift reaction over the structured catalyst,
outletting a first product gas comprising CO from the reactor system.

14. The process according to claim 13, wherein the structured catalyst has a first reaction zone disposed closest to the first end of said structured catalyst, wherein the first reaction zone has an overall exothermic reaction, and a second reaction zone disposed closest to the second end of said structured catalyst, wherein the second reaction zone has an overall endothermic reaction.

15. The process according to claim 14, wherein the first reaction zone has an extension of 5 to 60% of the length of the structured catalyst from its first to its second end.

16. The process according to claim 13, wherein the concentration of methane is higher in the partly catalyzed feedstock inside at least a part of the structured catalyst than in the feedstock and in the first product gas.

17. The process according to claim 13, wherein the temperature is continuously increasing from the first end to the second end of the structured catalyst.

18. The process according to claim 13, wherein said electrical power supply is dimensioned to heat at least part of said structured catalyst to a temperature of at least 500° C.

19. The process according to claim 13, wherein the pressure of the structured catalyst is between 2 and 30 bar.

20. The process according to claim 13, wherein the process further comprises the step of feeding the first product gas comprising synthesis gas to an upgrading unit and separating it into an upgraded synthesis gas stream and one or more off-gas stream.

* * * * *